(12) United States Patent
Bathwal et al.

(10) Patent No.: US 11,357,037 B2
(45) Date of Patent: Jun. 7, 2022

(54) SCHEDULING POLICIES FOR OUT-OF-ORDER GRANTS

(71) Applicant: QUALCOMM Incorporated, San Diego, CA (US)

(72) Inventors: Saket Bathwal, Hyderabad (IN); Arvind Santhanam, San Diego, CA (US); Gang Xiao, San Diego, CA (US); Rudhir Upretee, San Diego, CA (US); Scott Hoover, Del Mar, CA (US); Haiqin Liu, Santa Clara, CA (US); Xing Chen, San Diego, CA (US); Xiaojian Long, San Diego, CA (US); Peng Wu, Shanghai (CN); Ashwin Raman, San Diego, CA (US); Thomas Christol, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/619,042

(22) PCT Filed: Apr. 20, 2018

(86) PCT No.: PCT/CN2018/083871
§ 371 (c)(1),
(2) Date: Dec. 3, 2019

(87) PCT Pub. No.: WO2019/001112
PCT Pub. Date: Jan. 3, 2019

(65) Prior Publication Data
US 2020/0100280 A1    Mar. 26, 2020

(30) Foreign Application Priority Data
Jun. 26, 2017    (WO) ................ PCT/CN2017/090009

(51) Int. Cl.
H04W 72/14    (2009.01)
H04W 72/12    (2009.01)
H04L 5/00    (2006.01)

(52) U.S. Cl.
CPC ............. *H04W 72/14* (2013.01); *H04L 5/001* (2013.01); *H04L 5/0053* (2013.01); *H04W 72/1273* (2013.01)

(58) Field of Classification Search
CPC .. H04W 72/14; H04W 72/1273; H04L 5/001; H04L 5/0053
See application file for complete search history.

(56) References Cited

U.S. PATENT DOCUMENTS 8,140,781 B2    3/2012    Teh
8,441,953 B1*   5/2013    Becker ................ H04L 12/4625
                                                             370/252

(Continued)

FOREIGN PATENT DOCUMENTS

CN    101615985 A    12/2009
CN    102119381 A    7/2011

(Continued)

OTHER PUBLICATIONS

International Search Report and Written Opinion—PCT/CN2018/083871—ISA/EPO—dated Jul. 11, 2018 (P20182500).

(Continued)

*Primary Examiner* — Kevin C. Harper
(74) *Attorney, Agent, or Firm* — Loza & Loza LLP

(57) ABSTRACT

Various aspects of the disclosure relate to techniques for handling out-of-order grants. For example, upon detection of an out-of-order grant, the best scheduling policy for handling the out-of-order grants may be selected based on at least one traffic condition. In some aspects, a scheduling policy may involve canceling and regenerating out-of-order (Continued)

grants. In some aspects, a scheduling policy may involve reordering data units. In some aspects, a scheduling policy may involve designating a reorder time window.

21 Claims, 19 Drawing Sheets

(56) References Cited

U.S. PATENT DOCUMENTS

| | | | |
|---|---|---|---|
| 8,694,639 B1* | 4/2014 | Vermeulen | G06F 9/5011 709/226 |
| 9,119,109 B1 | 8/2015 | Dubrovsky et al. | |
| 9,585,048 B2 | 2/2017 | Ozturk et al. | |
| 10,172,155 B2 | 1/2019 | Rico et al. | |
| 2008/0045255 A1* | 2/2008 | Revel | H04L 1/1887 455/510 |
| 2013/0114598 A1 | 5/2013 | Schrum et al. | |
| 2014/0328349 A1 | 11/2014 | Morris | |
| 2016/0338096 A1 | 11/2016 | Vajapeyam et al. | |

FOREIGN PATENT DOCUMENTS

| | | |
|---|---|---|
| CN | 104270287 A | 1/2015 |
| EP | 2702821 A1 | 3/2014 |
| WO | 2015065914 | 5/2015 |
| WO | WO-2017019587 | 2/2017 |

OTHER PUBLICATIONS

International Search Report and Written Opinion—PCT/CN2017/090009—ISA/EPO—dated Mar. 14, 2018 (P20172075).

Mediatek Inc: "Out of Order Processing of MAC CEs", 3GPP Draft, 3GPP TSG-RAN WG2 #98, R2-1705518 Out of Order Processing of MAC CEs, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017 May 14, 2017 (May 14, 2017), XP051275877, 4 Pages, Retrieved from the Internet: URL: http://www.3gpp.org/ftp/Meetings_3GPP_SYNC/RAN2/Docs/ [retrieved on May 14, 2017].

Samsung: "The Impact of Processing Order of UL Grants on LCP", 3GPP Draft, 3GPP TSG RAN WG2 NR AH #2, R2-1706754—The Impact Of Processing Order of UL Grants On LCP, 3rd Generation Partnership Project (3GPP), Mobile Competence Centre, 650, Route Des Lucioles, F-06921 Sophia-Antipolis CE, vol. RAN WG2, No. Qingdao, China, Jun. 27, 2017-Jun. 29, 2017 Jun. 16, 2017 (Jun. 16, 2017), XP051306590, 5 Pages, Retrieved from the Internet: URL: http://www.3gpp.org/ftp/tsg_ran/WG2_RL2/TSGR2_AHs/2017_06_NR/Docs/ [retrieved on Jun. 16, 2017].

Supplementary European Search Report—EP18825150—Search Authority—The Hague—dated Dec. 23, 2020 (174375EP).

* cited by examiner

SCHEDULING POLICIES FOR OUT-OF-ORDER GRANTS

CROSS-REFERENCE TO RELATED APPLICATION(S)

This application is the U.S. national stage of PCT patent application number PCT/CN2018/083871 filed on Apr. 20, 2018 which claims priority to and benefit of PCT patent application number PCT/CN2017/090009 filed on Jun. 26, 2017, the content of each of which is incorporated herein by reference.

INTRODUCTION

Various aspects described herein relate to wireless communication and more particularly, but not exclusively, to handling out-of-order grants.

Wireless communication networks are widely deployed to provide various communication services such as telephony, video, data, messaging, broadcasts, and so on. Such networks, which are usually multiple access networks, support communication for multiple users by sharing the available communication resources.

In some networks, access to a communication resource may be scheduled. For example, a device may be scheduled to use a particular resource during a first period of time and another device scheduled to use the resource during a second period of time. To achieve a desired level of communication performance, it is important for the scheduling to provides access in a reliable manner. Thus, there is a need for effective techniques for scheduling devices on shared communication resources.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method of communication including: detecting at least one out-of-order grant of a traffic flow; determining a traffic condition associated with the traffic flow; and selecting a scheduling policy for the traffic flow based on the traffic condition.

In some aspects, the disclosure provides an apparatus for communication, including: a memory and a processor coupled to the memory. The processor and the memory are configured to: detect at least one out-of-order grant of a traffic flow; determine a traffic condition associated with the traffic flow; and select a scheduling policy for the traffic flow based on the traffic condition.

In some aspects, the disclosure provides an apparatus configured for communication. The apparatus including: means for detecting at least one out-of-order grant of a traffic flow; means for determining a traffic condition associated with the traffic flow; and means for selecting a scheduling policy for the traffic flow based on the traffic condition.

In some aspects, the disclosure provides a non-transitory computer-readable medium storing computer-executable code, including code to: detect at least one out-of-order grant of a traffic flow; determine a traffic condition associated with the traffic flow; and select a scheduling policy for the traffic flow based on the traffic condition.

In some aspects, the disclosure provides a method of communication including: detecting at least one out-of-order grant; assigning an out-of-order sequence number to the at least one out-of-order grant; and outputting the at least one out-of-order grant in conjunction with the out-of-order sequence number.

In some aspects, the disclosure provides an apparatus for communication, including: a memory and a processor coupled to the memory. The processor and the memory are configured to: detect at least one out-of-order grant; assign an out-of-order sequence number to the at least one out-of-order grant; and output the at least one out-of-order grant in conjunction with the out-of-order sequence number.

In some aspects, the disclosure provides an apparatus configured for communication. The apparatus including: means for detecting at least one out-of-order grant; means for assigning an out-of-order sequence number to the at least one out-of-order grant; and means for outputting the at least one out-of-order grant in conjunction with the out-of-order sequence number.

In some aspects, the disclosure provides a non-transitory computer-readable medium storing computer-executable code, including code to: detect at least one out-of-order grant; assign an out-of-order sequence number to the at least one out-of-order grant; and output the at least one out-of-order grant in conjunction with the out-of-order sequence number.

In some aspects, the disclosure provides a method of communication including: detecting at least one out-of-order grant; regenerating the at least one out-of-order grant to provide at least one in-order grant; and outputting the at least one in-order grant.

In some aspects, the disclosure provides an apparatus for communication, including: a memory and a processor coupled to the memory. The processor and the memory are configured to: detect at least one out-of-order grant; regenerate the at least one out-of-order grant to provide at least one in-order grant; and output the at least one in-order grant.

In some aspects, the disclosure provides an apparatus configured for communication. The apparatus including: means for detecting at least one out-of-order grant; means for regenerating the at least one out-of-order grant to provide at least one in-order grant; and means for outputting the at least one in-order grant.

In some aspects, the disclosure provides a non-transitory computer-readable medium storing computer-executable code, including code to: detect at least one out-of-order grant; regenerate the at least one out-of-order grant to provide at least one in-order grant; and output the at least one in-order grant.

In some aspects, the disclosure provides a method of communication including: obtaining an indication of a data unit reordering window; receiving at least one data unit; detecting at least one out-of-order sequence number associated with the at least one data unit; and reordering the at least one data unit during the data unit reordering window.

In some aspects, the disclosure provides an apparatus for communication, including: a memory and a processor coupled to the memory. The processor and the memory are configured to: obtain an indication of a data unit reordering window; receive at least one data unit; detect at least one out-of-order sequence number associated with the at least one data unit; and reorder the at least one data unit during the data unit reordering window.

In some aspects, the disclosure provides an apparatus configured for communication. The apparatus including: means for obtaining an indication of a data unit reordering window; means for receiving at least one data unit; means for detecting at least one out-of-order sequence number associated with the at least one data unit; and means for reordering the at least one data unit during the data unit reordering window.

In some aspects, the disclosure provides a non-transitory computer-readable medium storing computer-executable code, including code to: obtain an indication of a data unit reordering window; receive at least one data unit; detect at least one out-of-order sequence number associated with the at least one data unit; and reorder the at least one data unit during the data unit reordering window.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
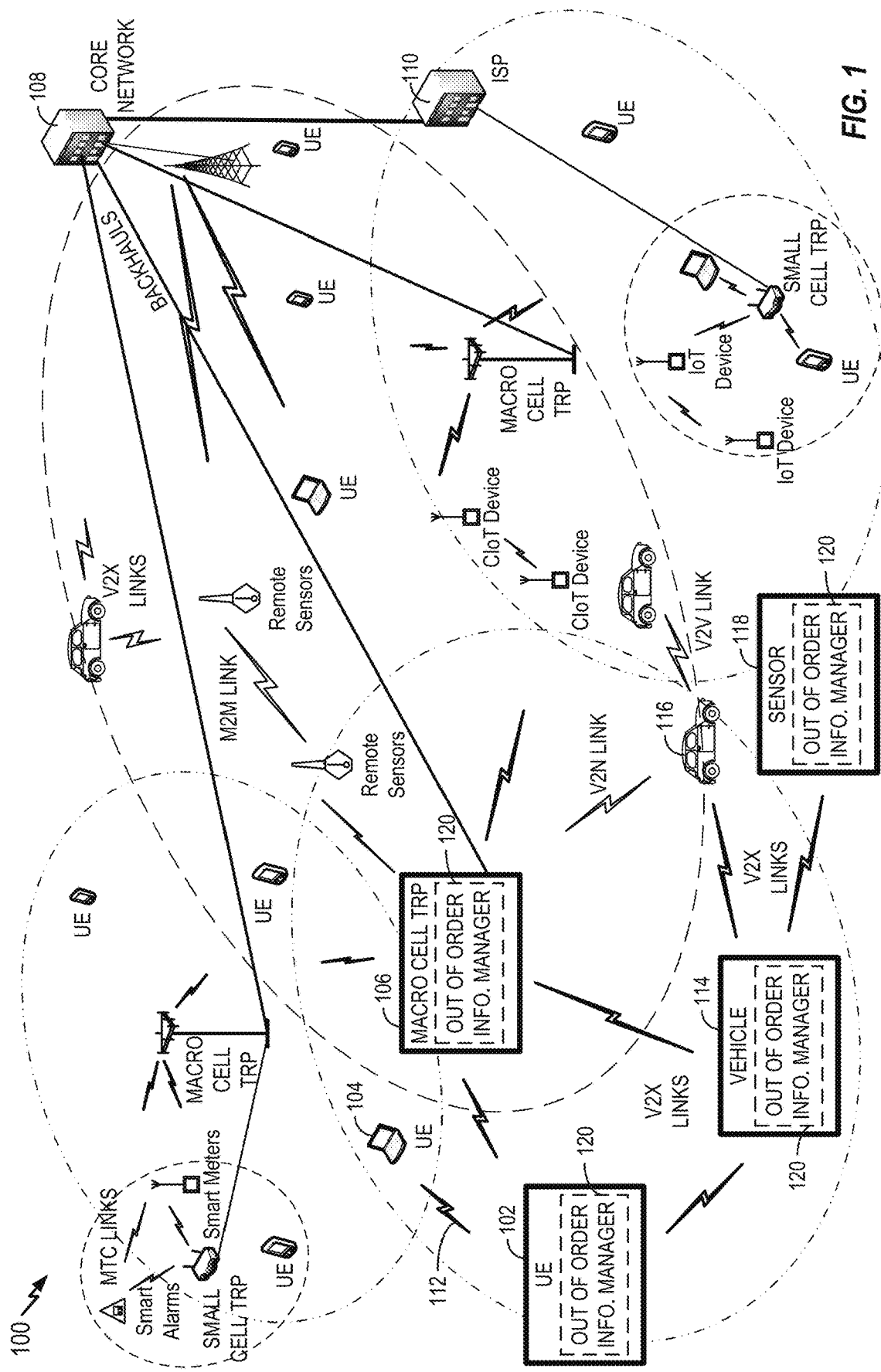
FIG. 1 is a diagram of an example communication system in which aspects of the disclosure may be used.

Various aspects of the disclosure relate to techniques for handling out-of-order grants. Under certain conditions, a device may generate a grant that is out of order. For example, the device may obtain (e.g., generate or receive) data units associated with a particular order and then generate grants for transmitting the data units in a different order (e.g., a grant for an earlier data unit is generated after a grant for a later data unit). Upon detection of such an out-of-order grant, the best scheduling policy for handling the out-of-order grants may be selected based on at least one traffic condition. In some aspects, a scheduling policy may involve canceling and regenerating out-of-order grants. In some aspects, a scheduling policy may involve reordering data units. In some aspects, a scheduling policy may involve designating a reorder time window.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network devices (e.g., a core network 108, an internet service provider (ISP) 110, peer devices, and so on).

In some cases, devices of the system 100 may communicate with each other directly via a direct link (e.g., a unicast or broadcast link) such as the link 112. A direct link may take the form of, for example, a vehicle-to-anything (V2X) link, a vehicle-to-vehicle (V2V) link, a vehicle-to-network (V2N) link, or a device-to-device (D2D) link. As shown in FIG. 1, a first vehicle 114 may communicate via V2X Sidelink communication (or via a similar form of communication such as V2V or V2N Sidelink communication) with a second vehicle 116, the UE 102, a sensor 118, the TRP 106, or some other device (e.g., component) of the system 100.

In accordance with the teachings herein, devices of the system 100 may include functionality for managing out-of-order traffic. For example, each of the first vehicle 114, the second vehicle 116, the UE 102, the sensor 118, the TRP 106, or any component of the system 100, may include an out-of-order information manager 120.

The devices and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of links may be supported in the wireless communication system 100. For example, D2D links may include, without limitation, machine-to-machine (M2M) links, MTC links, V2V links, and V2X links Network-to-device links may include, without limitation, uplinks (or reverse links), downlinks (or forward links), V2N links, and V2X links Broadcast links may include, without limitation, V2V links, V2X links, M2M links, and MTC links. In some aspects, V2V and V2N communication may be considered as examples of V2X communication.

Example Communication Components

Figure 2:
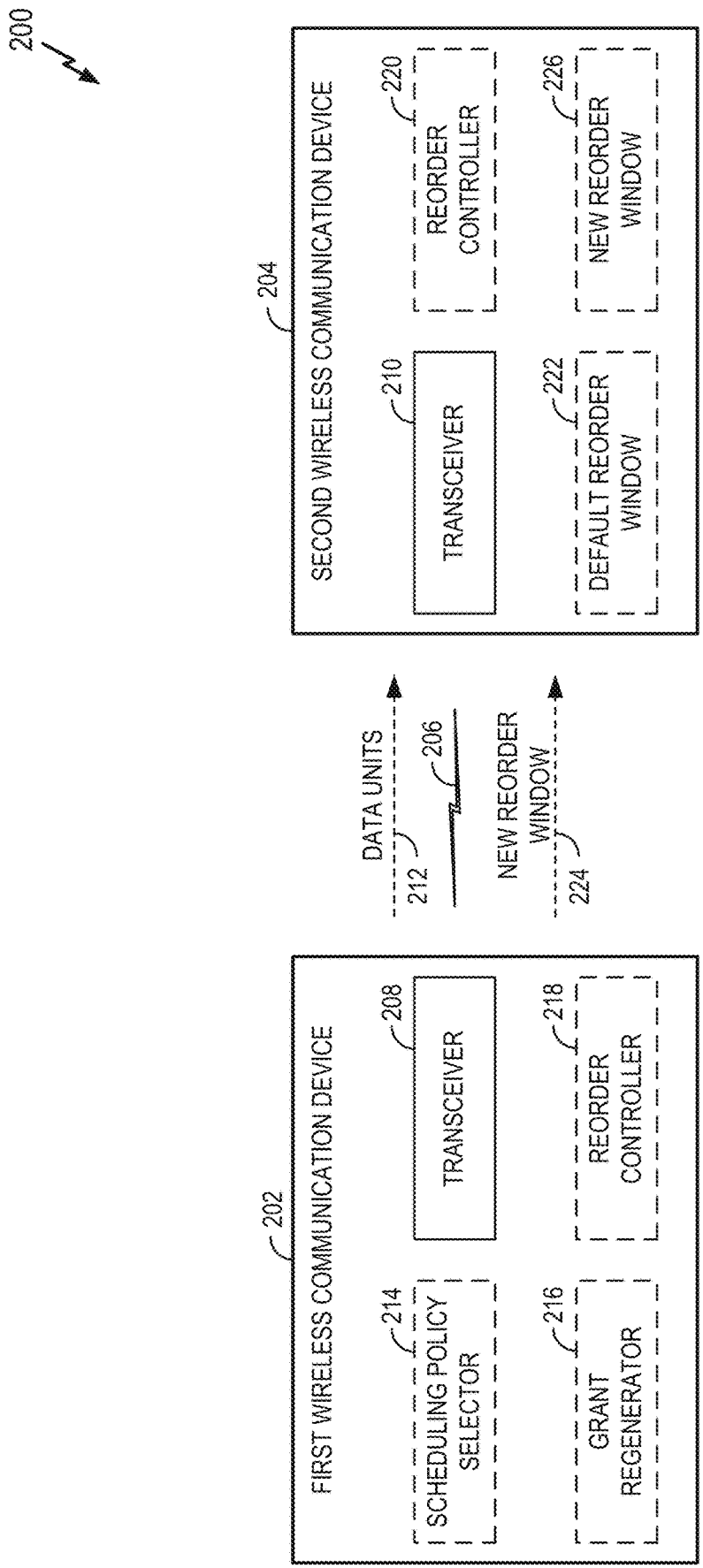
FIG. 2 is a block diagram of example communication components in accordance with some aspects of the disclosure.

FIG. 2 illustrates another example of a wireless communication system 200 where a first wireless communication device 202 communicates with a second wireless communication device 204 via a communication link 206. To this end, the first wireless communication device 202 includes a transceiver 208 while the second wireless communication device 204 includes a transceiver 210. The communication link 206 may take the form of, for example, a V2X Sidelink or some other suitable communication link (e.g., a V2V link, a V2N link, a D2D link, etc.).

The devices of the wireless communication system 200 may access other peer communication devices, other communication devices of an associated wide area network, or communication devices in other networks (not shown). To reduce the complexity of FIG. 2, only two devices are shown. In practice, a wireless communication system may include more of these devices. In some implementations, the first wireless communication device 202 may correspond to the first vehicle 114 or some other device of FIG. 1. In addition, the second wireless communication device 204 may correspond to the UE 102, the second vehicle 116, or some other device of FIG. 1.

The first wireless communication device 202 may transmit data units 212 via unicast signaling (e.g., to the second wireless communication device 204), broadcast signaling, or some other form of signaling. For certain types of links (e.g., V2X links or other type of links), the first wireless communication device 202 generates grants for the transmission of the data units 212.

As used herein, the term grant refers to a scheduling signal (e.g., a message) that serves to schedule a communication resource. As discussed herein, a set of grants may be ordered in some manner. Also, it should be appreciated that a grant may take the form of a grant message or some other form (e.g., referred to using some other terminology).

Under certain conditions, the first wireless communication device 202 may generate a grant that is out-of-order. For example, the first wireless communication device 202 may obtain (e.g., generate or receive) data units associated with a particular order and then generate grants for transmitting the data units in a different order. That is, the first wireless communication device 202 may generate a grant for a later data unit prior to generating a grant for an earlier data unit. This situation may occur, for example, if the second data unit requires fewer resources for transmission than the first data unit and the next available resource will accommodate the second data unit but not the first data unit.

In accordance with some aspects of the disclosure, upon detection of an out-of-order grant, the first wireless communication device 202 selects a scheduling policy for handling the out-of-order grant. To this end, the first wireless communication device 202 may include a scheduling policy selector 214. In some aspects, a goal of the selection process may be to identify the scheduling policy that works best under current conditions. For example, the selection of a scheduling policy may be based on at least one traffic condition.

In some aspects, a scheduling policy may involve regenerating an out-of-order grant. For example, upon detection of an out-of-order grant, the first wireless communication device 202 may cancel the out-of-order grant and then regenerate the grant so that the grant occurs in the correct order. Thus, a grant for a later data unit originally scheduled to occur prior to a grant for an earlier data unit may be canceled and regenerated at a time that follows the grant for the earlier data unit. To this end, the first wireless communication device 202 may include a grant regenerator 216.

In some aspects, a scheduling policy may involve reordering data units. For example, upon detection of an out-of-order grant, the first wireless communication device 202 may reorder the sequence numbers of the associated data units. To this end, the first wireless communication device 202 may include a reorder controller 218.

In scenarios where the first wireless communication device 202 reorders data units, the second wireless communication device 204 will reorder these data units upon receipt so that the data units are processed in the appropriate order. To this end, the second wireless communication device 204 may include a reorder controller 220.

In some cases, the second wireless communication device 204 may restrict the amount of time allowed for the reordering of received data units. For example, a default reorder window 222 may specify the maximum of time that a lower layer protocol of the second wireless communication device 204 may spend reordering received data units. In the event the data units are not completely reordered within the period of time specified by the reorder window, the lower protocol layer may flush the accumulated data units to an upper protocol layer for handling at that layer.

In some aspects, a scheduling policy may involve designating a reorder time window. For example, the reorder controller 218 may dynamically determine the size of a reorder window to be used by a receiving device for reordering received reordered data units. The first wireless communication device 202 then transmits an indication of the new reorder window 224. Upon receipt of this indication, the second wireless communication device 204 maintains a local copy of the new reorder window 226. Thus, the reorder controller 220 may use the default reorder window 222 if a new reorder window 226 has not been configured. Otherwise, the reorder controller 220 may use the new reorder window 226.

V2X Sidelink Communication

For purposes of illustration, various aspects of the disclosure will be described in the context of V2X Sidelink communication. It should be appreciated, however, that the teachings herein are not limited to V2X communications. For example, the teachings herein may be applicable to any wireless system that has broadcast communications (e.g., 3GPP Public Safety Transmission Mode 2, etc.).

V2X Sidelink traffic supports a distributed mode of transmission scheduling (Transmission Mode 4) in Rd. 14 of the 3GPP specification. In this release, a semi-persistent transmission-based mechanism was introduced. V2X Traffic uses Packet Data Convergence Protocol (PDCP) and Radio Link Control—Unacknowledged Mode (RLC-UM) to transmit and receive Internet Protocol (IP) and non-IP messages.

V2X traffic from a device may be periodic in nature. This periodic nature can be exploited to sense congestion on a resource and estimate future congestion on that resource. For example, resources may be reserved based on these estimations. This technique optimizes the use of the channel by enhancing resource separation between transmitter devices (e.g., devices that are currently transmitting) that are using overlapping resources.

The V2X Transmission Mode 4 Grant generation algorithm can result in out-of-order grants based on 3GPP defined procedures (i.e., grants can be swapped). Out-of-order grants could lead to fragmentation and an increase in the message error rate. For example, video traffic is highly variable. If the latency target is tight, the corresponding grants may be in-order. However, if the latency target is larger, the corresponding grants may be out-of-order by design.

In addition, due to RLC fragmentation, extra resources may be needed to accommodate an associated increase in the number of RLC headers that need to be sent.

Packet error rate, Perr(N, MCS), may be defined as the effective message error rate when a message is fragmented using "N" transport blocks (TBs) transmitted using the same modulation and coding scheme (MCS). Assuming an independent and identically distributed (i.i.d.) transport block error rate, the packet error rate at a given SNR has a significant increase in message error rate as given by Equation 1:

$$\text{Perr}(N, MCS) = 1 - (1 - \text{Perr}(1, MCS))^N. \qquad \text{EQUATION 1}$$

Figure 3:
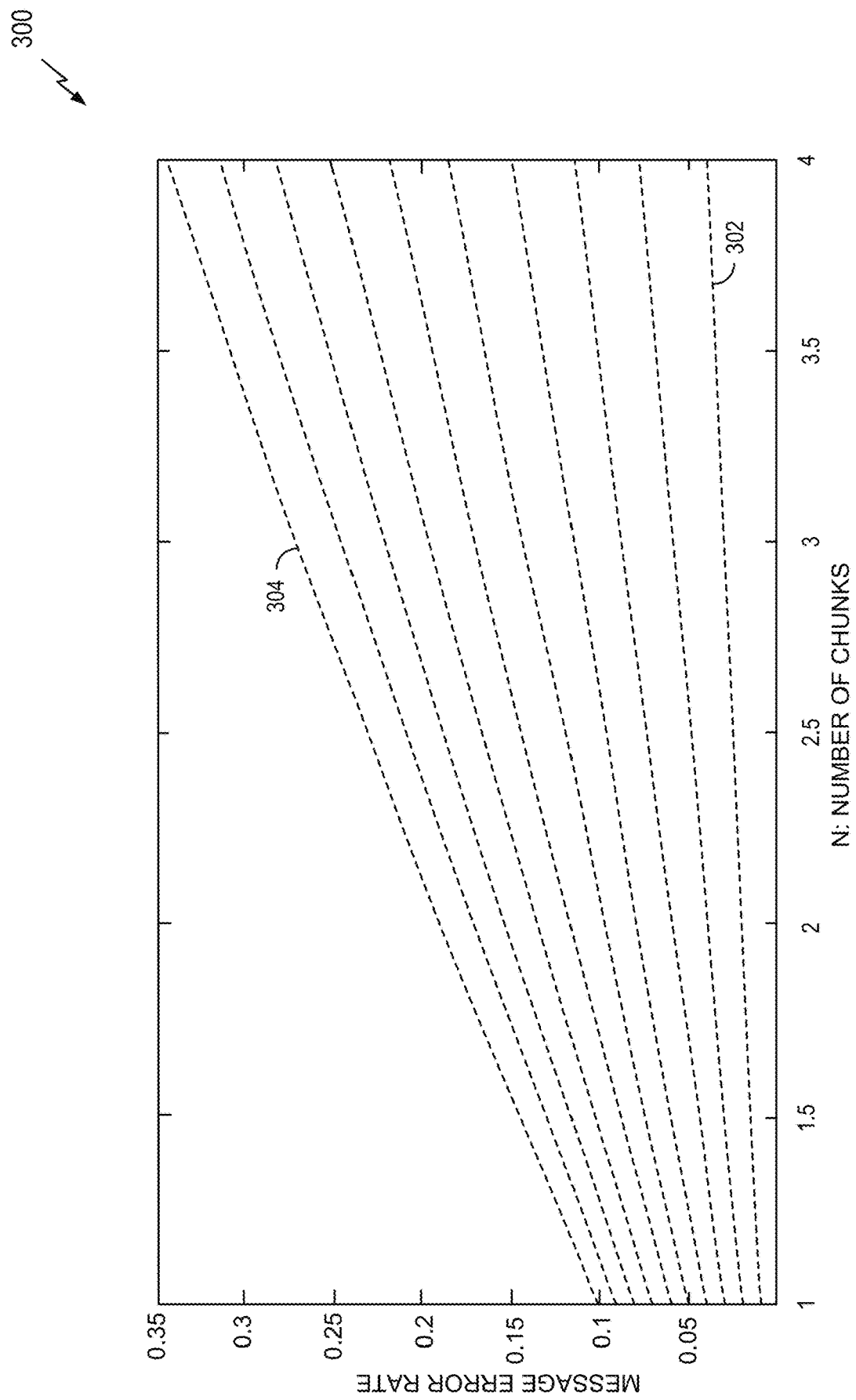
FIG. 3 is a diagram illustrating an example of how message fragmentation may affect a message error rate.

The graph 300 of FIG. 3 illustrates how an increase in the number of fragments leads to an increase in the message error rate. The graph 300 shows a range of Pen values on 0.01 increments from a 0.01 Pen 302 to a 0.1 Pen 304.

Example Out-of-Order Grant Handling

One technique for handling out-of-order grants involves controlling transmission based on the grant size. For example, a byte stream of messages may be transmitted based on the corresponding grant size. In this case, PDUs may be built in sequence.

This technique may result in frequent RLC fragmentation. RLC fragmentation can, in turn, negatively impact overall system capacity. Moreover, the message error rate may increase due to frequent fragmentation, thereby reducing the reliability of packet delivery.

Figure 4:
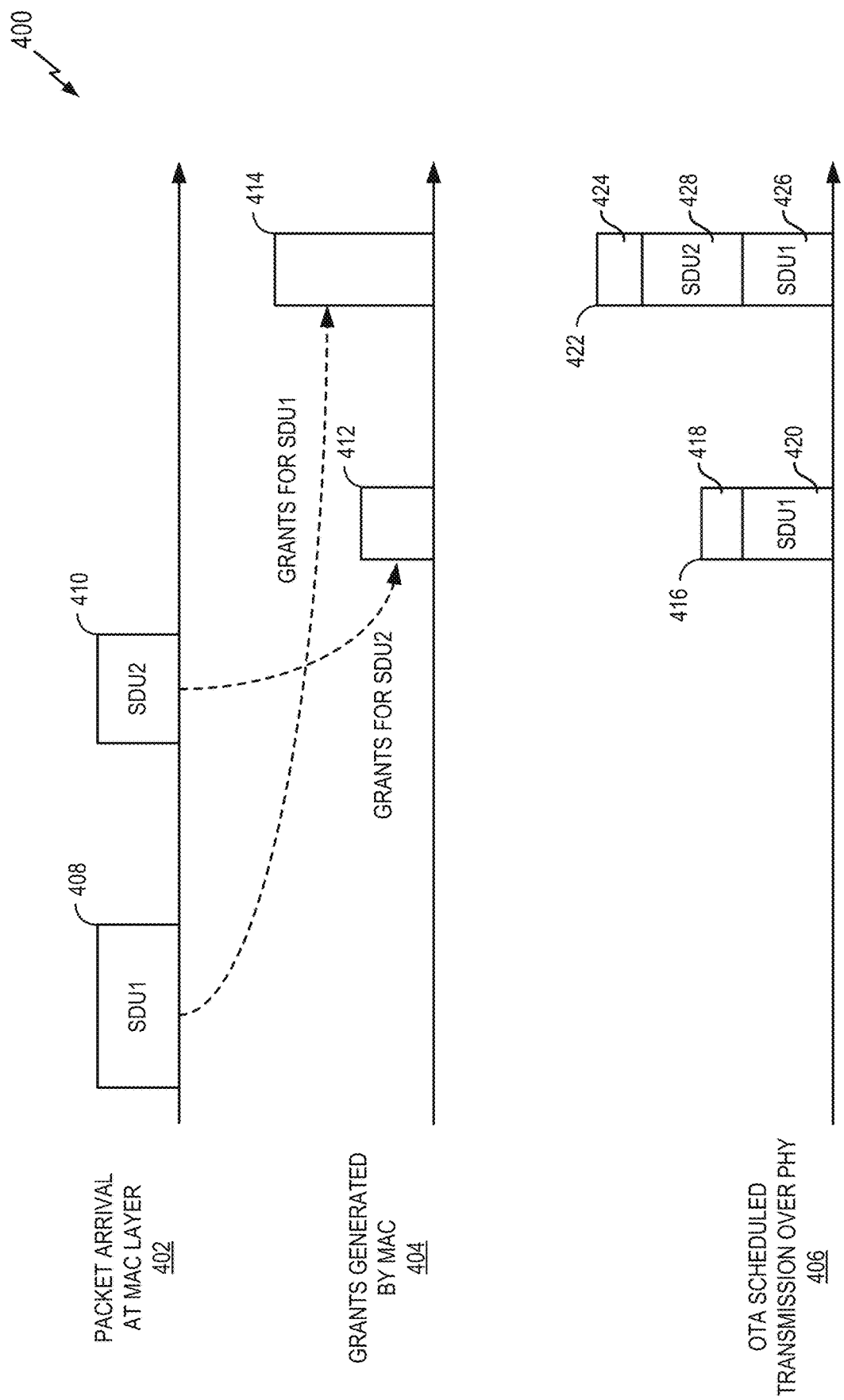
FIG. 4 is a diagram of example scheduling and transmission operations in accordance with some aspects of the disclosure.
Figure 5:
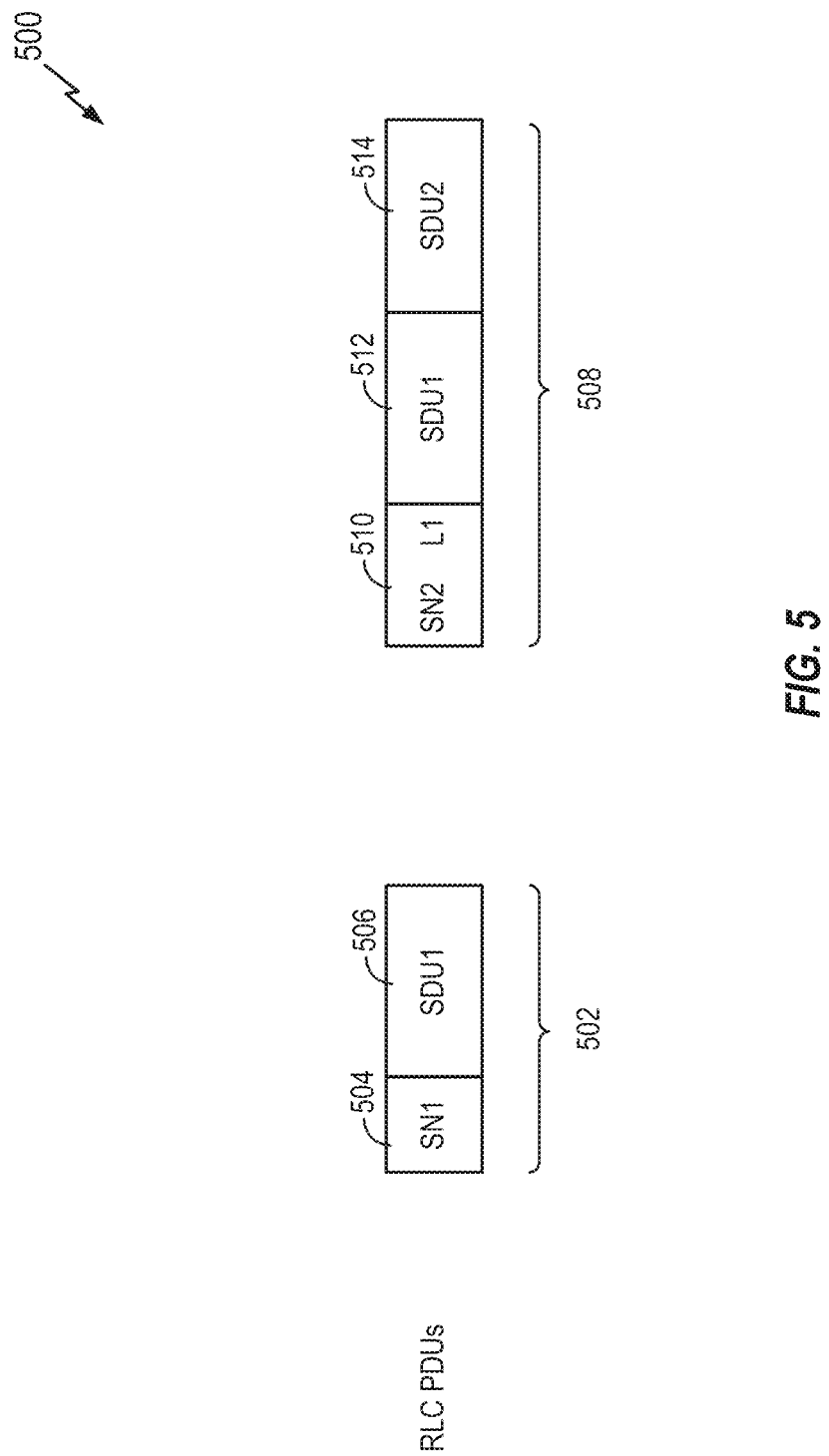
FIG. 5 is a diagram of example data units in accordance with some aspects of the disclosure.

FIGS. 4 and 5 illustrate an example of this grant size-based technique. Referring initially to FIG. 4, a signaling diagram 400 shows signaling for the arrival of packets at a media access control (MAC) layer 402, grants generated by the MAC 404, and over-the-air (OTA) transmission over a physical layer (PHY) 406. In some implementations, the PHY transmission may be for a Physical Sidelink Control Channel (PSCCH) and/or a Physical Sidelink Shared Channel (PSSCH).

At the MAC layer, a first Service Data Unit (SDU1) 408 arrives followed by a second SDU (SDU2) 410. The MAC schedules a grant 412 for the second SDU 410 prior to scheduling a grant 414 for the first SDU 408 (e.g., due to resource availability).

In response to the grant 412, a corresponding RLC Protocol Data Unit (PDU) 416 is transmitted OTA. The RLC PDU 416 includes an RLC header 418 and a first portion of SDU1 420.

In response to the grant 414, a corresponding RLC Protocol Data Unit (PDU) 422 is transmitted OTA. The RLC PDU 422 includes an RLC header 424, a second portion of SDU1 426, and SDU2 428.

FIG. 5 illustrates corresponding RLC PDUs 500 in more detail. A first RLC PDU 502 includes an RLC header 504 with a first sequence number (SN1) and a first portion of the SDU1 506. A second RLC PDU 508 includes an RLC header 510 with a second sequence number (SN2) and a length indicator (LI). The second RLC PDU 508 also includes second portion of the SDU1 512, along with the SDU2 514.

Selection of Scheduling Policy for OoO Grants

The disclosure relates in some aspects to techniques for handling out-of-order grants. In some aspects, these techniques may be referred to as a scheduling policies. Four techniques (referred to, for convenience, as methods in the discussion that follows) are described below. It should be appreciated that a different number of techniques and/or different types of techniques could be used.

A first method involves a composition of the second though fourth methods. For example, the first method could involve a combination of the second and third methods, a combination of the second, third, and fourth methods, or a combination of the second and fourth methods.

A second method involves grant regeneration. Upon detecting the generation of an out-of-order grant, a grant is regenerated to enable in-order grant generation. This method may be particularly well suited for scenarios when a channel is not busy (e.g., a Channel Busy Rate (CBR) is low) and there is sufficient margin in the scheduling deadlines for rescheduling grants for queued data. In congested scenarios and/or when deadlines are very tight, this method may be relatively capacity-inefficient.

A third method involves assigning out-of-order RLC PDUs. Here, grants may be generated normally (e.g., according to 3GPP rules), however, RLC-UM Sequence Numbers (SNs) are assigned out-of-order to compensate for the out-of-order grants. With this method, complexity associated with the handling of the out-of-order SNs may increase as the out-of-orderness increases. Here, out-of-orderness may be defined, for example, as the percentage of grants that are out-of-order.

A fourth method corresponds to the handling out-of-order grants described above that involves controlling transmission based on the grant size. As discussed above, this method may result in fragmentation which, in turn, can lead to an increase in the message error rate.

Selection of Scheduling Policy for OoO Grants

The disclosure relates in some aspects to dynamically selecting a technique (e.g. a scheduling policy) to handle out-of-order grants. In some aspects, this dynamic selection corresponds to the first method described above (e.g., dynamic selection of one of the second method, the third method, or the fourth method). Examples of conditions (criteria) for selecting a particular method are set forth below. It should be appreciated that different conditions may be used in difference scenarios.

One or more of the conditions that follow may be considered in determining whether to invoke grant generation (the second method). These conditions may include whether: the channel is not busy, a deadline can still be met if in-order grant generation is performed, or information is received indicating that a high level of fragmentation has been seen at a receiver device (e.g., a device that is currently receiving). In some aspects, a determination of whether a channel is busy may be based on a Channel Busy Rate (CBR). For example, the CBR may be compared to a threshold. In some aspects, the deadline may relate to whether a hybrid automatic repeat request deadline can be met. In some aspects, a receiver device (e.g., a UE) may send feedback to a transmitter device to indicate whether the receiver device is seeing frequent RLC fragmentation (e.g., at a rate above a threshold) of messages from the transmitter device. This feedback may be sent, for example, via additional RLC signaling or piggybacked with a payload.

One or more of the conditions that follow may be considered in determining whether to invoke out-of-order RLC PDUs (the third method): the deadline is tight, the fragmentation rate using this method is lower than the fragmentation rate achieved using the fourth method, there is no memory constraint at corresponding receiver devices, or information is received indicating that a high level of fragmentation has been seen at a receiver device. In some aspects, a tight deadline may indicate that the deadline might not or cannot be met if in-order grant generation is performed. In some aspects, a receiver device may send feedback to a transmitter device to indicate whether the receiver device has a memory constraint (e.g., insufficient memory to buffer all of the RLC messages that need reordering). This feedback may be sent, for example, via additional RLC signaling or piggybacked with a payload.

One or more of the conditions that follow may be considered in determining whether to schedule traffic based on the grant size (the fourth method): the messages are approximately the same size (e.g., within a threshold size range), the above conditions for the second method are not satisfied, or the above conditions for the third method are not satisfied.

Figure 6:
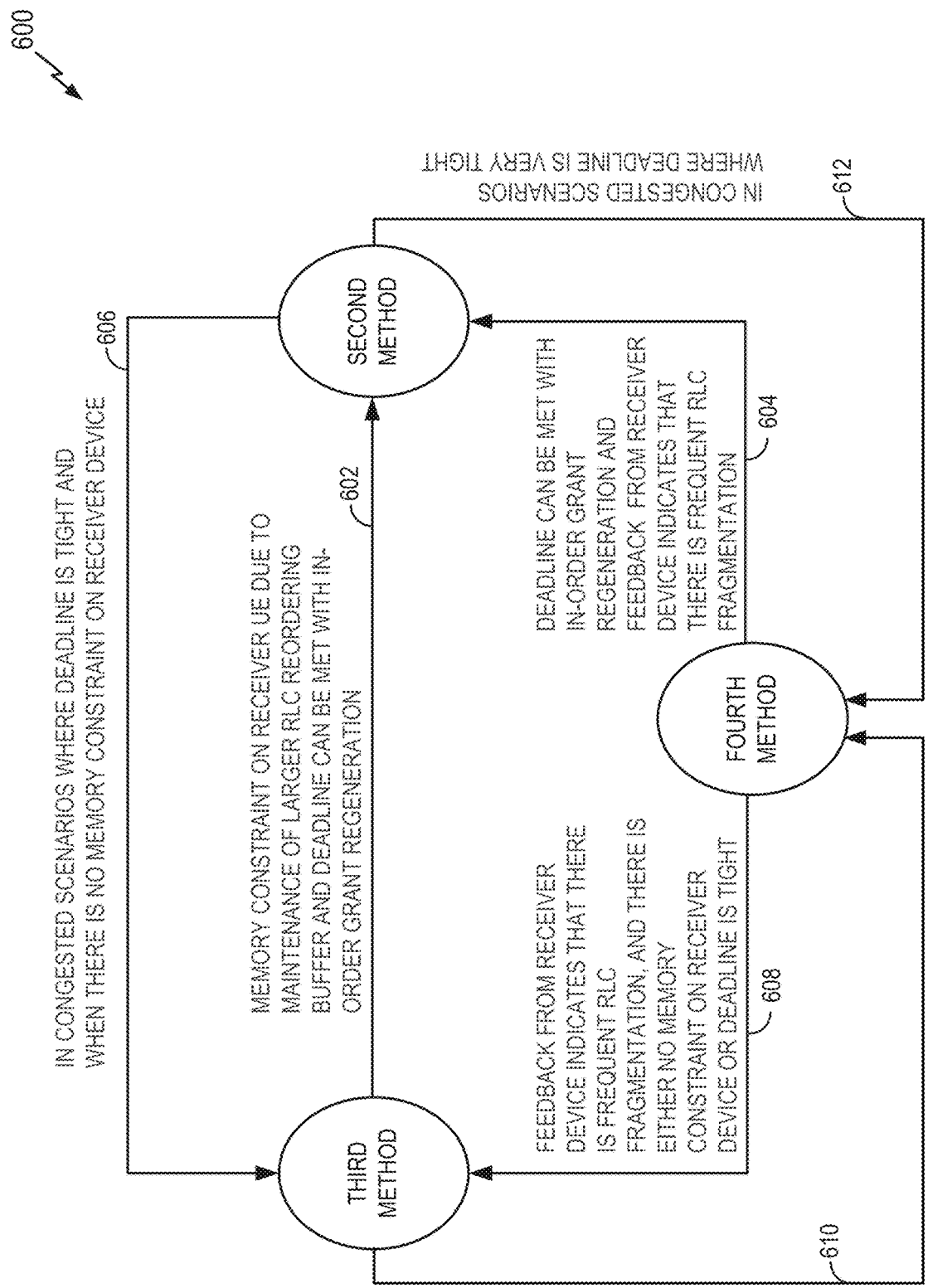
FIG. 6 is a block diagram illustrating an example of scheduling policy selection in accordance with some aspects of the disclosure.

FIG. 6 illustrates an example of a decision process 600 for determining whether to invoke the second method, the third method, or the fourth method in view of current conditions. As indicated, these conditions may relate in some aspects to traffic conditions associated with a transmitter device and/or a receiver device.

As represented by a control path 602, the second method may be invoked if there is a memory constraint at at least one receiver device (e.g., due to maintenance of a larger RLC reordering buffer) and if the deadline can be met with in-order grant regeneration.

As represented by a control path 604, the second method may be invoked if the deadline can be met with in-order grant regeneration and if feedback from at least one receiver device indicates that there is frequent RLC fragmentation.

As represented by a control path 606, the third method may be invoked in congestion scenarios if there is no memory constraint at a corresponding receiver device and if the deadline is tight.

As represented by a control path 608, the third method may be invoked if feedback from at least one receiver device indicates that there is frequent RLC fragmentation and if either there is no memory constraint at a corresponding receiver device or the deadline is tight.

As represented by a control path 610, the fourth method may be invoked if there is a memory constraint at at least one receiver device (e.g., due to maintenance of a larger RLC reordering buffer).

As represented by a control path 612, the fourth method may be invoked in congestion scenarios if the deadline is tight.

In-Order Grant Regeneration Details

As discussed above, the second method may involve regenerating out-of-order grants to provide in-order grants. A transmitter device, upon detecting an out-of-order grant, cancels the current grant and regenerates the grant. In some aspects, this method may be particularly advantageous for lower CBR scenarios and scenarios with longer deadlines that allow for regeneration of grants of queued packets. In this method, delivery of RLC PDUs can be in-sequence and with no RLC fragmentation. Consequently, this method can provide relatively lower packet error rates for transmissions. This stands in contrast with methods that fragment messages into N TBs where the $Perr(N)=1-(1-Perr(1))^2$ at a given SNR leads to a significant increase in packet error. However, as discussed above, in congested scenarios and/or when deadlines are very tight, this method may be relatively capacity-inefficient.

Figure 7:
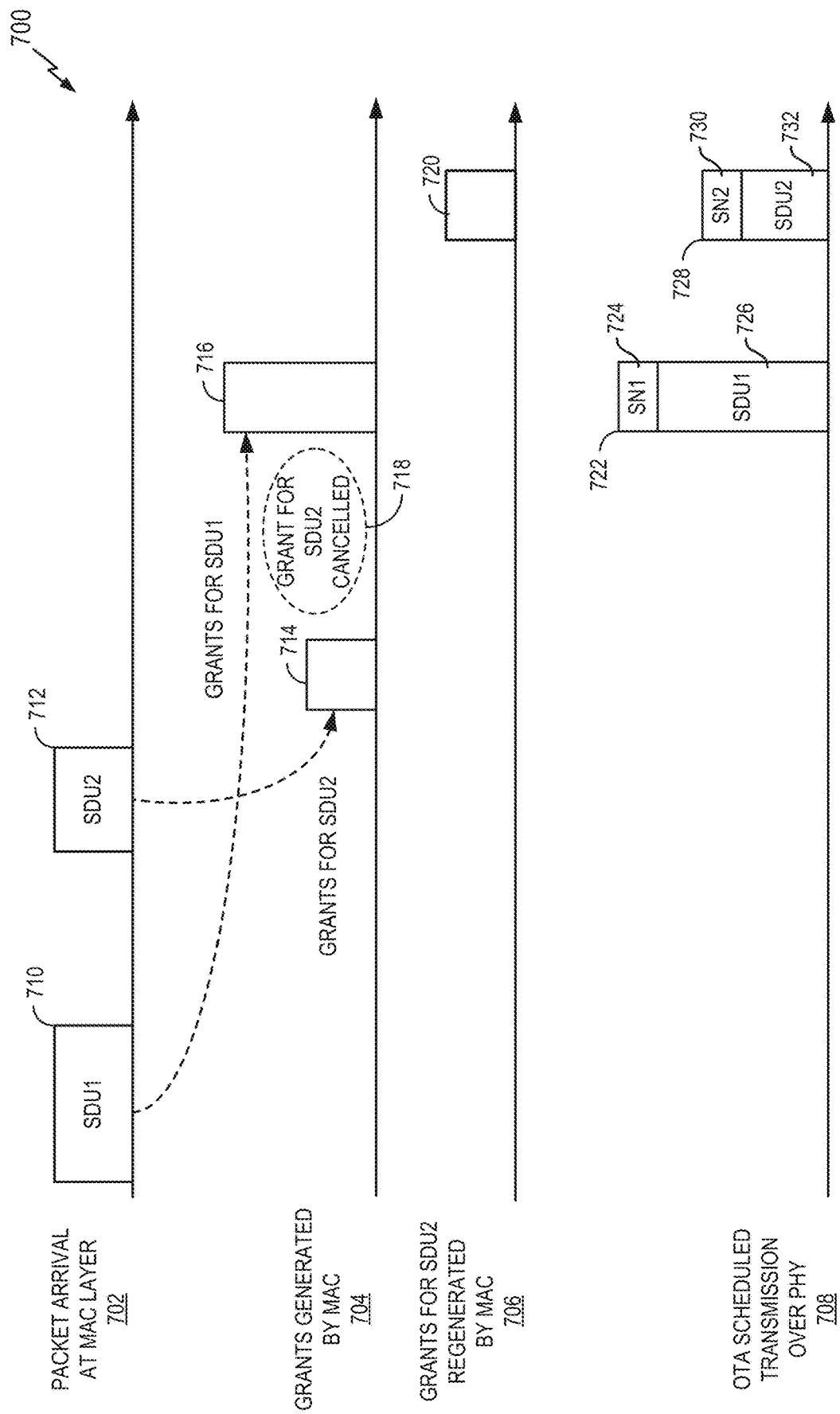
FIG. 7 is a diagram illustrating an example of grant regeneration in accordance with some aspects of the disclosure.
Figure 8:
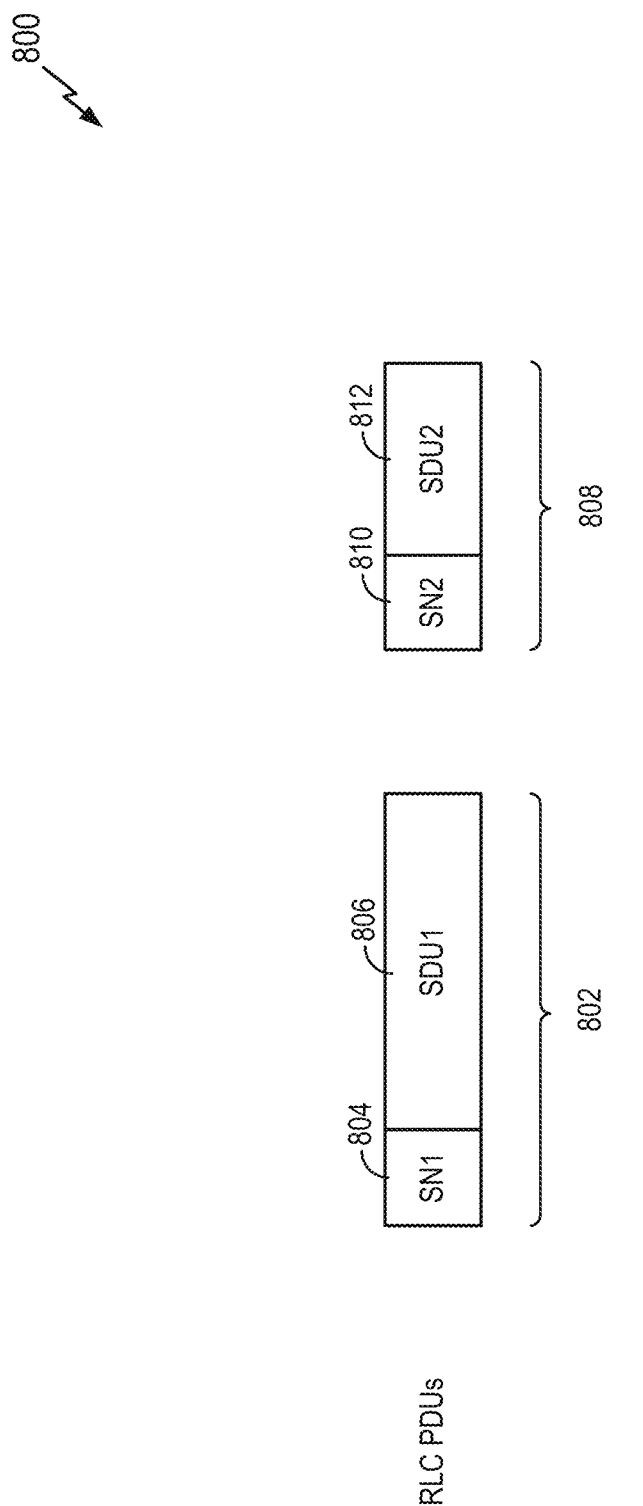
FIG. 8 is a diagram of another example of data units in accordance with some aspects of the disclosure.

FIGS. 7 and 8 illustrate an example of this grant regeneration-based technique. Referring initially to FIG. 7, a signaling diagram 700 shows signaling for packet arrival at a media access control (MAC) layer 702, grants generated by the MAC 704, grants for SDU2 generated by the MAC 706, and over-the-air (OTA) transmission over a physical layer (PHY) 708. Similar to FIG. 4, the PHY transmission may be for a PSCCH and/or a PSSCH.

At the MAC layer, a first Service Data Unit (SDU1) 710 arrives followed by a second SDU (SDU2) 712. The MAC schedules a grant 714 for the second SDU 712 prior to scheduling a grant 716 for the first SDU 710 (e.g., due to resource availability). Accordingly, the MAC cancels 718 the grant 714 and generates a new grant 720 for SDU2.

In response to the grant 716, a corresponding RLC Protocol Data Unit (PDU) 722 is transmitted OTA. The RLC PDU 722 includes an RLC header 724 and SDU1 726.

In response to the grant 720, a corresponding RLC Protocol Data Unit (PDU) 728 is transmitted OTA. The RLC PDU 728 includes an RLC header 730 and SDU2 732.

FIG. 8 illustrates corresponding RLC PDUs 800 in more detail. A first RLC PDU 802 includes an RLC header 804 with a first sequence number (SN1), and SDU1 806. A second RLC PDU 808 includes an RLC header 810 with a second sequence number (SN2), and SDU2 812.

Out-of-Order Sequence Numbers

As discussed above, the third method may involve assigning out-of-order sequence numbers upon detection of out-of-order (OoO) grants. A transmitter device will pre-assign an RLC sequence number for transmission of a data unit or data units. In addition, the transmitter device will add an OoO header including a t_reorder field for each RLC PDU, thereby requesting each receiver device to dynamically readjust its RLC reorder window timer. A flag (e.g., TRUE/FALSE) may be used to indicate if the t_reorder field needs to be applied. In some aspects, t_reorder may be a function of the maximum OTA scheduled transmission pending time among all outstanding PDUs. Thus, the time duration may account for both new retransmissions and all HARQ retransmissions. In some aspects, t_reorder may be an enumeration (see Table 1 below) that gives a range of time delay values to be used by the receiver device to determine the maximum amount of time it is to spend reordering received data units.

When the transmitter device sees out-of-order grants, a receiver device may therefore see out of order RLC PDUs. Accordingly, the receiver device will buffer received PDUs so it can process (e.g., reorder) the PDUs in the correct order.

Figure 9:
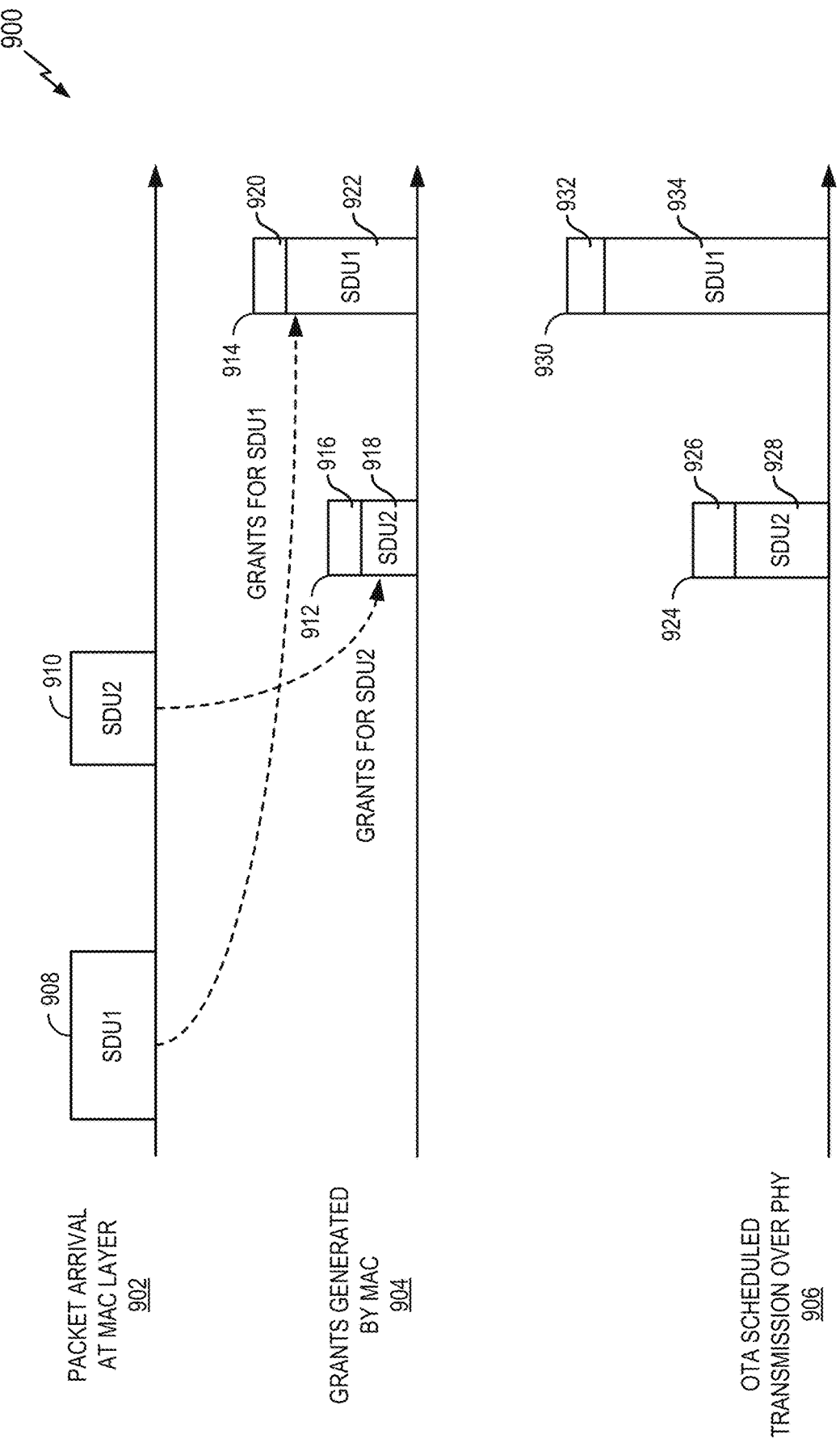
FIG. 9 is a diagram illustrating an example of data unit reordering in accordance with some aspects of the disclosure.
Figure 10:
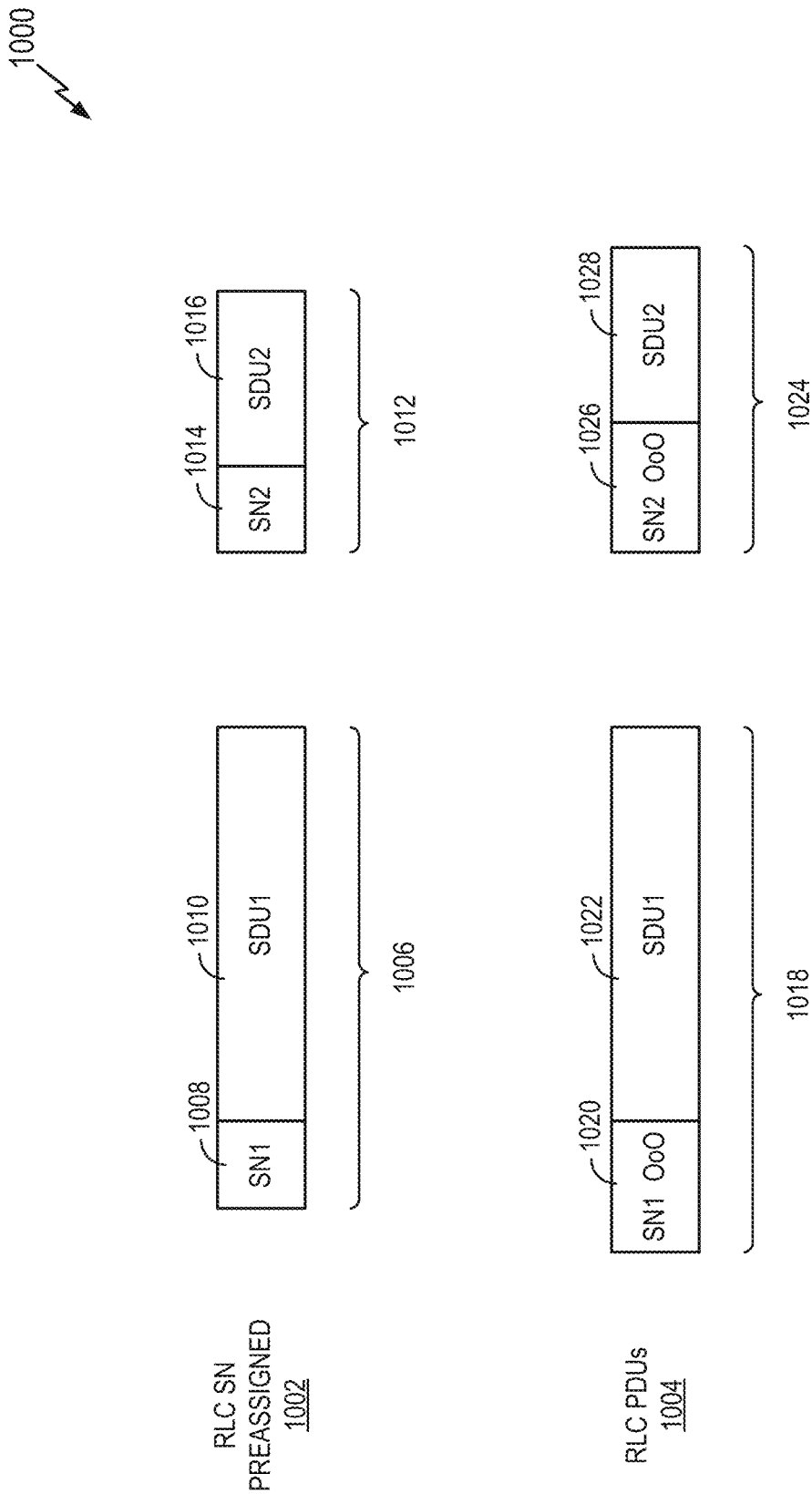
FIG. 10 is a diagram of another example of data units in accordance with some aspects of the disclosure.

FIGS. 9 and 10 illustrate an example of this out-of-order SN-based technique. Referring initially to FIG. 9, a signaling diagram 900 shows signaling for packet arrival at a media access control (MAC) layer 902, grants generated by the MAC 904, and over-the-air (OTA) transmission over a physical layer (PHY) 906. Similar to FIG. 4, the PHY transmission may be for a PSCCH and/or a PSSCH.

At the MAC layer, a first Service Data Unit (SDU1) 908 arrives followed by a second SDU (SDU2) 910. The MAC schedules a grant 912 for the second SDU 910 prior to scheduling a grant 914 for the first SDU 908 (e.g., due to resource availability). The grant 912 is associated with a second sequence number (SN2) 916 and SDU2 918. The grant 914 is associated with a first sequence number (SN1) 920 and SDU1 922.

In response to the grant 912, a corresponding RLC Protocol Data Unit (PDU) 924 is transmitted OTA. The RLC PDU 924 includes an RLC header 926 and SDU2 928.

In response to the grant 914, a corresponding RLC Protocol Data Unit (PDU) 930 is transmitted OTA. The RLC PDU 930 includes an RLC header 932 and SDU1 934.

FIG. 10 illustrates corresponding RLC PDUs 1000 in more detail. Here, RLC PDUs 1002 with a preassigned SN are generated first. Then, RLC PDUs 1004 with an OoO field are generated.

For the RLC PDUs 1002, a first RLC PDU 1006 includes an RLC header 1008, with a first sequence number (SN1), and SDU1 1010. A second RLC PDU 1012 includes an RLC header 1014, with a second sequence number (SN2), and SDU2 1016.

For the RLC PDUs 1004, a first RLC PDU 1018 includes an RLC header 1020, including a first sequence number (SN1) and an OoO header, and SDU1 1022. A second RLC PDU 1024 includes an RLC header 1026, including a second sequence number (SN2) and an OoO header, and SDU2 1028.

A receiver device may adjust its reordering timer dynamically based on information carried in the RLC OoO header. For example, based on congestion and the priority of the packets, the receiver device may maintain a cap after which it will stop the reordering timer and then flush all of the accumulated PDUs in sequence to an upper layer.

With the third method, packets are not fragmented, thus improving the reliability of packets provided to applications. However, this method may require the receiver device to maintain a larger RLC reordering buffer when a larger number of outstanding PDUs are out-of-order. Consequently, this method may be more complex than other operations when a large number of PDUs are out-of-order. Table 1 is an example of a Timer to Enumeration conversion table for a t_reorder field in an OoO header.

TABLE 1

| Enumeration | Time (ms) |
| --- | --- |
| T_REORDER_WIN_1 | 0-50 |
| T_REORDER_WIN_2 | 50-100 |
| T_REORDER_WIN_3 | 100-150 |
| T_REORDER_WIN_4 | 150-200 |
| T_REORDER_WIN_5 | 200-250 |
| T_REORDER_MAX | >250 |

Figure 11:
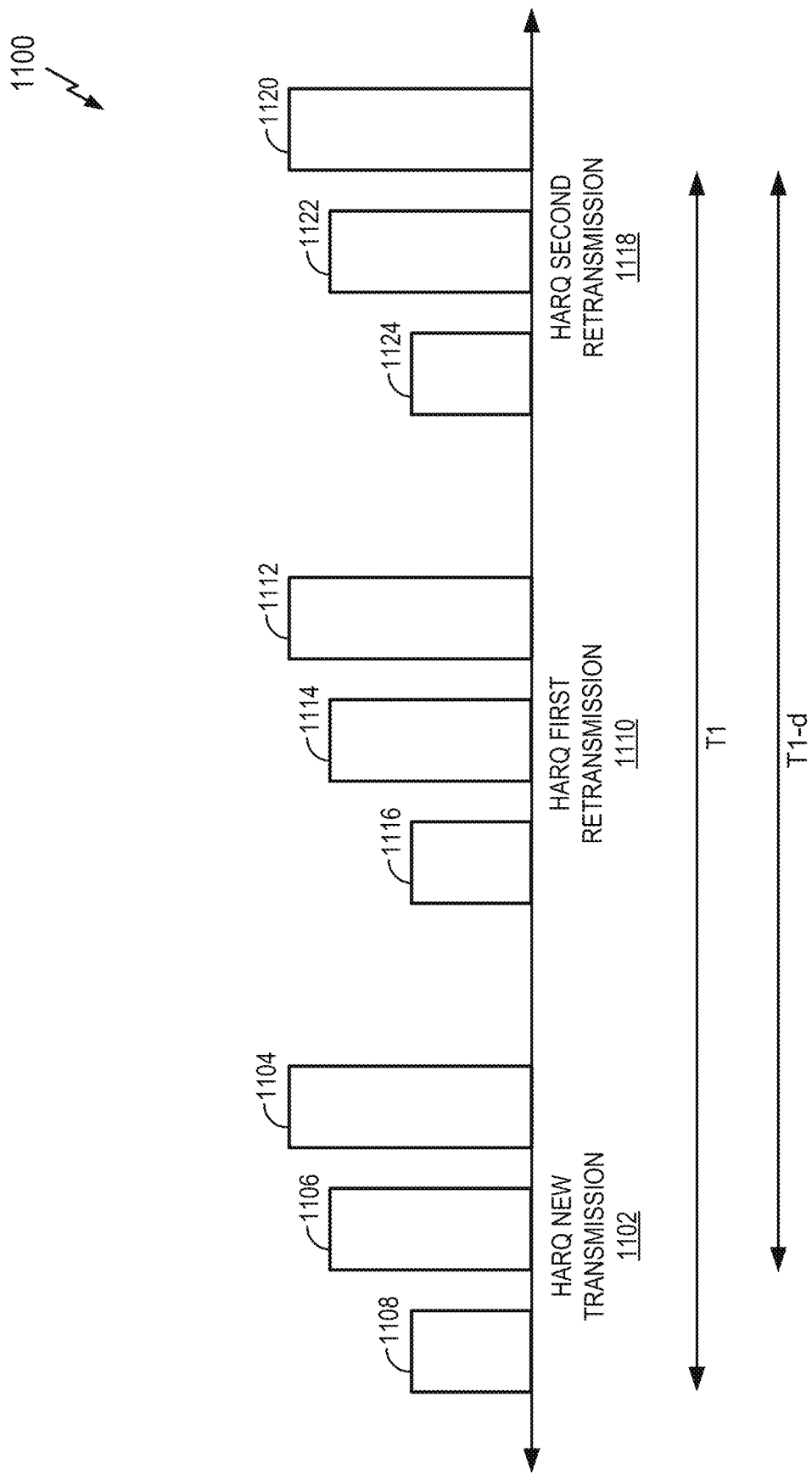
FIG. 11 is a diagram illustrating an example of reorder windows in accordance with some aspects of the disclosure.

FIG. 11 illustrates an example of a t_reorder calculation 1100 by a transmitter device. In this example, the number of SDUs=3 and the maximum number of HARQ retransmissions=2. For a new transmission 1102, an SDU1 grant 1104, an SDU2 grant 1106, and an SDU3 grant 1108 are shown. For a first HARQ retransmission 1110, an SDU1 grant 1112, an SDU2 grant 1114, and an SDU3 grant 1116 are shown.

For a second HARQ retransmission 1118, an SDU1 grant 1120, an SDU2 grant 1122, and an SDU3 grant 1124 are shown.

The following values are included in the RLC header for the respective PDUs. Here, the OoO fields are the TRUE/FALSE flag, and the t_reorder value. For SDU2, the RLC header specifies SN=2, and OoO<TRUE,T1>. For SDU3, the RLC header specifies SN=3, and OoO<TRUE,T1-d>. For SDU1, the RLC header specifies SN=1, and OoO<FALSE,NULL>. The corresponding values for T1 and T1-d are shown in FIG. 11.

If an RLC PDU received by a receiver device does not carry an OoO header, the receiver device may use a default reordering timer (e.g., reordering timer=T_REORDER_DEFAULT). Otherwise (e.g., if the flag in OoO header is TRUE), the receiver device may extract t_reorder from OoO header (e.g., T1) and use reordering timer=T1.

If there are no missing RLC PDUs, the receiver device may stop the reordering timer. Otherwise, the receiver device may use reordering timer=T_REORDER_DEFAULT.

Figure 12:
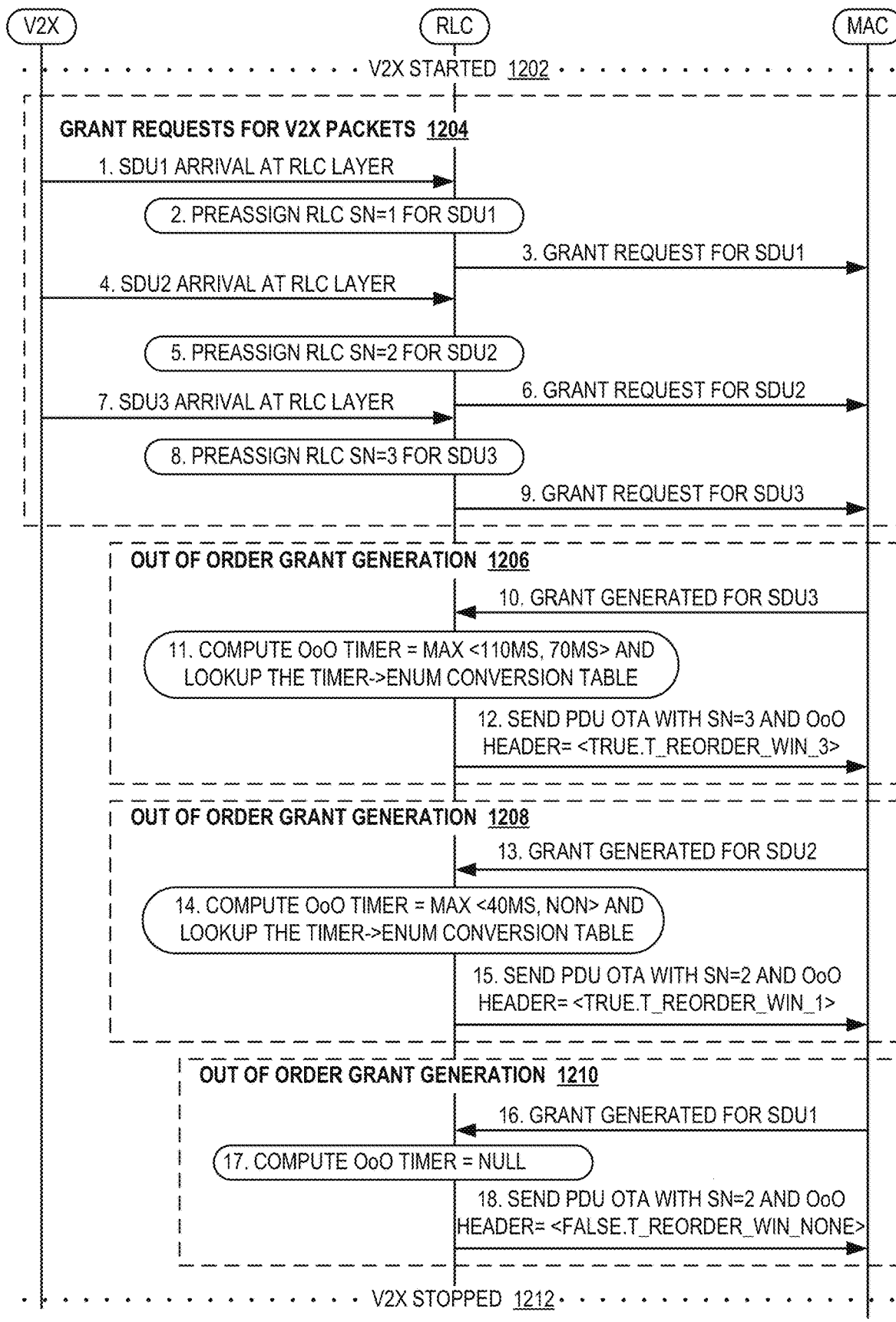
FIG. 12 is a diagram illustrating an example of a transmitter sending out-of-order data units.

FIG. 12 illustrates an example message flow for a scenario where a transmitter device sends out-of-order PDUs. As indicated, this message flow corresponds to a V2X layer, an RLC layer, and a MAC layer. At some point in time, V2X is started 1202.

Grants requests are then generated for V2X packets 1204. At step 1, SDU1 arrives at the RLC layer. At step 2, RLC SN=1 is preassigned for SDU1. At step 3, a grant request for SDU1 is sent to the MAC layer. That is, the RLC requests the MAC to generate a grant for SDU1. At step 4, SDU2 arrives at the RLC layer. At step 5, RLC SN=2 is preassigned for SDU2. At step 6, a grant request for SDU2 is sent to the MAC layer. That is, the RLC requests the MAC to generate a grant for SDU2. At step 7, SDU3 arrives at the RLC layer. At step 8, RLC SN=3 is preassigned for SDU3. At step 9, a grant request for SDU3 is sent to the MAC layer. That is, the RLC requests the MAC to generate a grant for SDU3.

Steps 10-12 involve out-of-order grant generation 1206 for SDU3. At step 10, the MAC layer generates a grant for SDU3. The PHY also provides an OTA scheduled delay for SDU1 (110 ms) and SDU2 (70 ms). At step 11, the RLC computes the OoO timer value. At step 12, the RLC invokes transmission of a PDU OTA with SN=3 and the OoO header.

Steps 13-15 involve out-of-order grant generation 1208 for SDU2. At step 13, the MAC layer generates a grant for SDU2. The PHY also provides an OTA scheduled delay for SDU1 (40 ms). At step 14, the RLC computes the OoO timer value. At step 12, the RLC invokes transmission of a PDU OTA with SN=2 and the OoO header.

Steps 16-18 involve out-of-order grant generation 1210 for SDU1. At step 16, the MAC layer generates a grant for SDU1. At step 17, the RLC sets the OoO timer value=NULL. At step 18, the RLC invokes transmission of a PDU OTA with SN=1 and the OoO header. V2X is subsequently stopped 1212.

Figure 13:
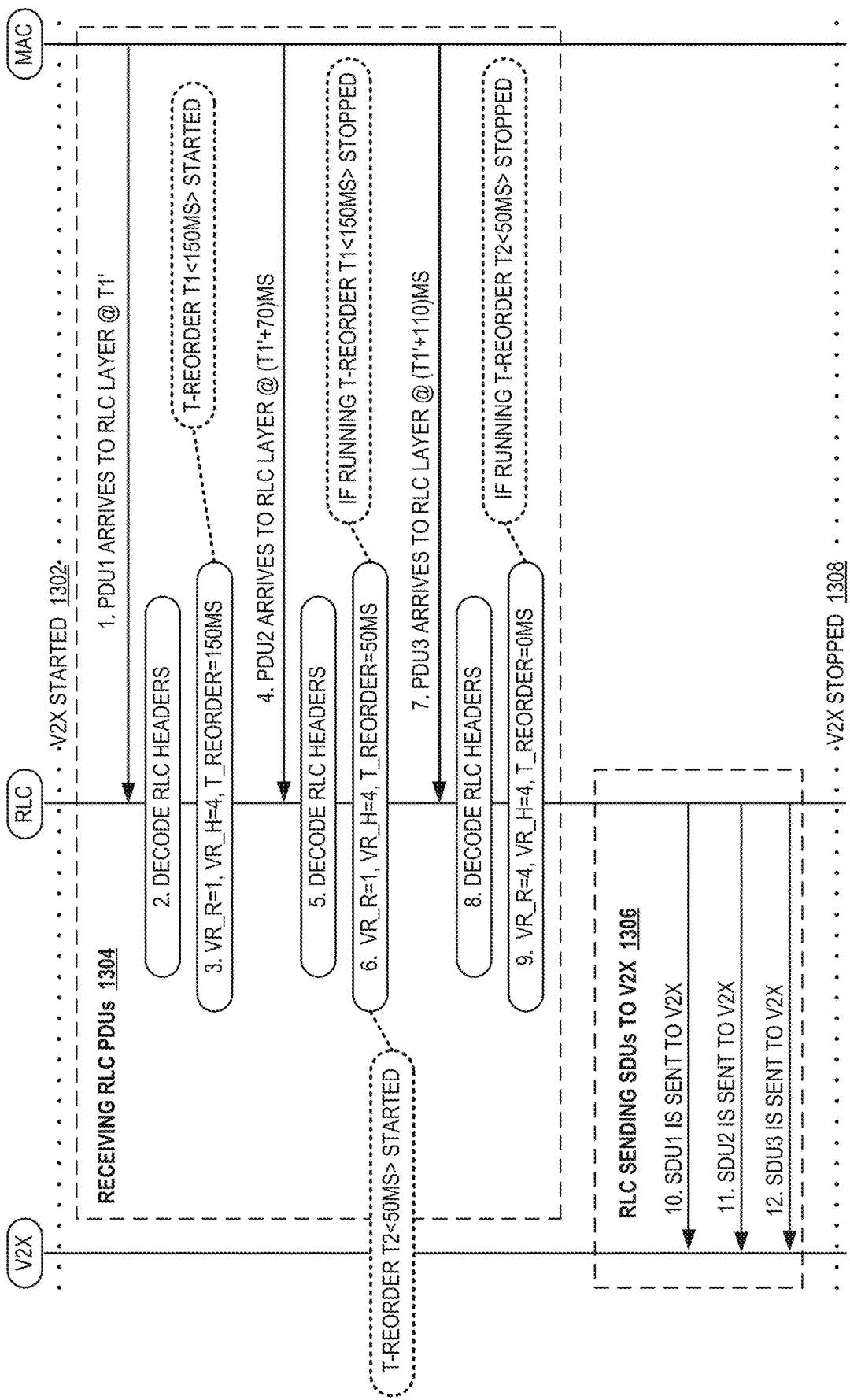
FIG. 13 is a diagram illustrating an example of a receiver reordering out-of-order data units.

FIG. 13 illustrates an example message flow for a scenario where a receiver device reorders out-of-order PDUs. As indicated, this message flow corresponds to a V2X layer, an RLC layer, and a MAC layer. At some point in time, V2X is started 1302.

Steps 1-9 involve reception of RLC PDUs 1304 (e.g., at a UE). At step 1, PDU1 arrives at the RLC layer. At step 2, the device decodes the RLC headers. At step 3, the device determines the corresponding t_reorder value. At step 4, PDU2 arrives at the RLC layer. At step 5, the device decodes the RLC headers. At step 6, the device determines the corresponding t_reorder value. At step 7, PDU3 arrives at the RLC layer. At step 8, the device decodes the RLC headers. At step 9, the device determines the corresponding t_reorder value.

Steps 10-12 involve the RLC layer sending SDUs to the V2X layer 1306. At step 10, SDU1 is sent to V2X. At step 11, SDU2 is sent to V2X. At step 12, SDU3 is sent to V2X. V2X is subsequently stopped 1308.

First Example Apparatus

Figure 14:
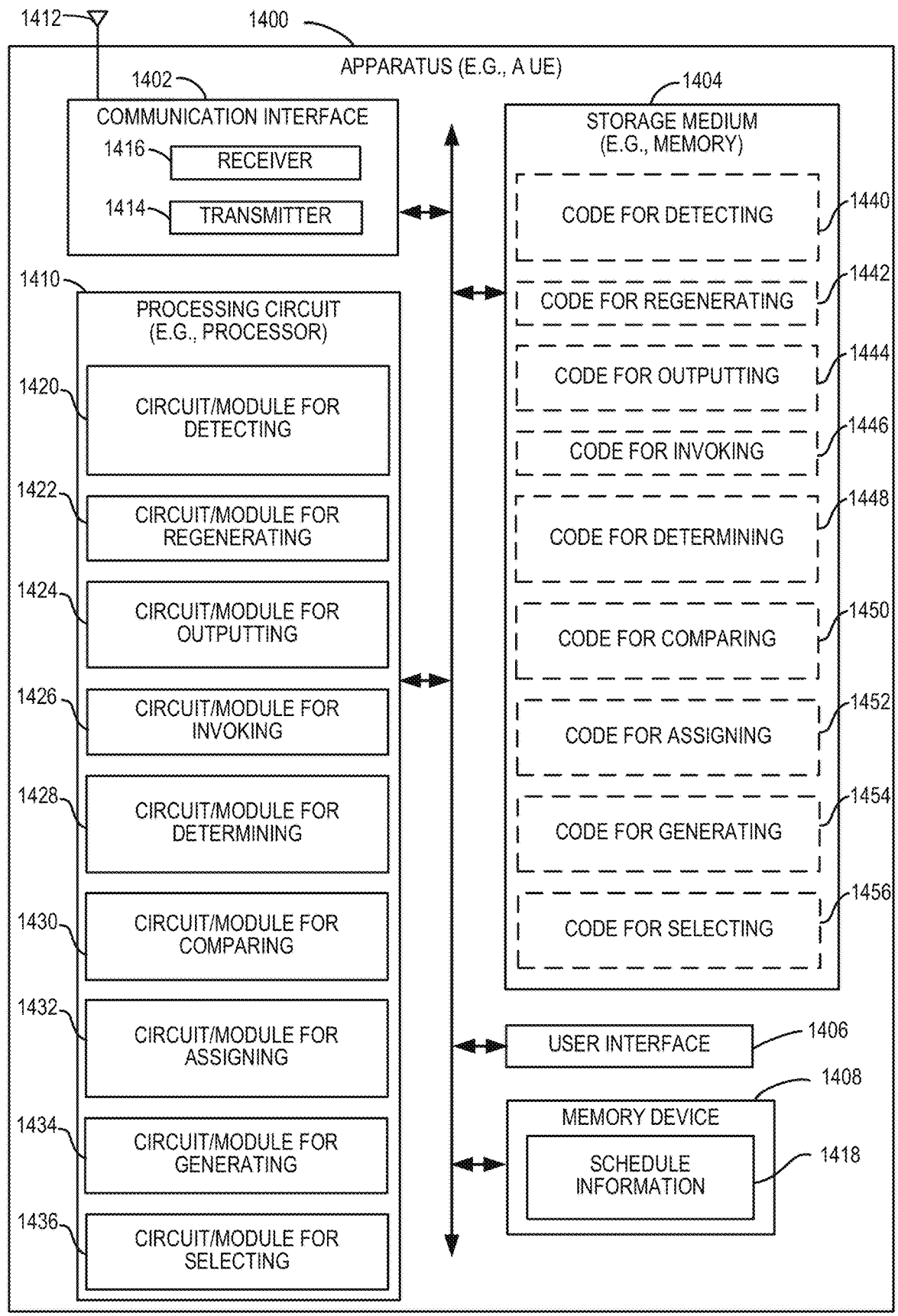
FIG. 14 is a block diagram illustrating an example hardware implementation for an apparatus (e.g., an electronic device) that can support communication in accordance with some aspects of the disclosure.

FIG. 14 illustrates a block diagram of an example hardware implementation of an apparatus 1400 configured to communicate (e.g., using OoO scheduling) according to one or more aspects of the disclosure. The apparatus 1400 could embody or be implemented within a UE, a transmit receive point (TRP), a gNB, an access point, or some other type of device that supports that supports wireless communication with scheduling as taught herein. In various implementations, the apparatus 1400 could embody or be implemented within an access terminal, a base station, or some other type of device. In various implementations, the apparatus 1400 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1400 includes a communication interface 1402 (e.g., at least one transceiver), a storage medium 1404, a user interface 1406, a memory device 1408, and a processing circuit 1410 (e.g., at least one processor). These components can be coupled to and/or placed in electrical communication with one another via a signaling bus or other suitable component, represented generally by the connection lines in FIG. 14. The signaling bus may include any number of interconnecting buses and bridges depending on the specific application of the processing circuit 1410 and the overall design constraints. The signaling bus links together various circuits such that each of the communication interface 1402, the storage medium 1404, the user interface 1406, and the memory device 1408 are coupled to and/or in electrical communication with the processing circuit 1410. The signaling bus may also link various other circuits (not shown) such as timing sources, peripherals, voltage regulators, and power management circuits, which are well known in the art, and therefore, will not be described any further.

The communication interface 1402 provides a means for communicating with other apparatuses over a transmission medium. In some implementations, the communication interface 1402 includes circuitry and/or programming adapted to facilitate the communication of information bi-directionally with respect to one or more communication devices in a network. For example, the communication interface 1402 may be adapted to facilitate wireless communication of the apparatus 1400. Thus, in some implementations, the communication interface 1402 may be coupled to one or more antennas 1412 as shown in FIG. 14 for wireless communication within a wireless communication system. In some implementations, the communication interface 1402 may be configured for wire-based communication. For example, the communication interface 1402 could be a bus interface, a send/receive interface, or some other type of signal interface including drivers, buffers, or other circuitry for outputting and/or obtaining signals (e.g., outputting signal from and/or receiving signals into an integrated circuit). The communication interface 1402 can be configured with one or more standalone receivers and/or transmitters, as well as one or more transceivers. In the illustrated example, the communication interface 1402 includes a transmitter 1414 and a receiver 1416. The communication interface 1402 serves as one example of a means for receiving and/or a means transmitting.

The memory device 1408 may represent one or more memory devices. As indicated, the memory device 1408 may maintain schedule information 1418 along with other information used by the apparatus 1400. In some implementations, the memory device 1408 and the storage medium 1404 are implemented as a common memory component. The memory device 1408 may also be used for storing data that is manipulated by the processing circuit 1410 or some other component of the apparatus 1400.

The storage medium 1404 may represent one or more computer-readable, machine-readable, and/or processor-readable devices for storing programming, such as processor executable code or instructions (e.g., software, firmware), electronic data, databases, or other digital information. The storage medium 1404 may also be used for storing data that is manipulated by the processing circuit 1410 when executing programming. The storage medium 1404 may be any available media that can be accessed by a general purpose or special purpose processor, including portable or fixed storage devices, optical storage devices, and various other mediums capable of storing, containing or carrying programming.

By way of example and not limitation, the storage medium 1404 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1404 may be embodied in an article of manufacture (e.g., a computer program product). By way of example, a computer program product may include a computer-readable medium in packaging materials. In view of the above, in some implementations, the storage medium 1404 may be a non-transitory (e.g., tangible) storage medium.

The storage medium 1404 may be coupled to the processing circuit 1410 such that the processing circuit 1410 can read information from, and write information to, the storage medium 1404. That is, the storage medium 1404 can be coupled to the processing circuit 1410 so that the storage medium 1404 is at least accessible by the processing circuit 1410, including examples where at least one storage medium is integral to the processing circuit 1410 and/or examples where at least one storage medium is separate from the processing circuit 1410 (e.g., resident in the apparatus 1400, external to the apparatus 1400, distributed across multiple entities, etc.).

Programming stored by the storage medium 1404, when executed by the processing circuit 1410, causes the processing circuit 1410 to perform one or more of the various functions and/or process operations described herein. For example, the storage medium 1404 may include operations configured for regulating operations at one or more hardware blocks of the processing circuit 1410, as well as to utilize the communication interface 1402 for wireless communication utilizing their respective communication protocols. In some aspects, the storage medium 1404 may include a non-transitory computer-readable medium storing computer-executable code, including code to perform the functionality described herein.

The processing circuit 1410 is generally adapted for processing, including the execution of such programming stored on the storage medium 1404. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1410 is arranged to obtain, process and/or send data, control data access and storage, issue commands, and control other desired operations. The processing circuit 1410 may include circuitry configured to implement desired programming provided by appropriate media in at least one example. For example, the processing circuit 1410 may be implemented as one or more processors, one or more controllers, and/or other structure configured to execute executable programming Examples of the processing circuit 1410 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1410 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1410 are for illustration and other suitable configurations within the scope of the disclosure are also contemplated.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-13 and 15-17. As used herein, the term "adapted" in relation to the processing circuit 1410 may refer to the processing circuit 1410 being one or more of configured, used, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 11-13 and 15-17. The processing circuit 1410 may serve as one example of a means for transmitting and/or a means for receiving. In various implementations, the processing circuit 1410 may provide and/or incorporate, at least in part, the functionality described above for the first wireless communication device 202 (e.g., the scheduling policy selector 214, the grant regenerator 216, the reorder controller 218, or any combination thereof) of FIG. 2.

According to at least one example of the apparatus 1400, the processing circuit 1410 may include one or more of a circuit/module for detecting 1420, a circuit/module for regenerating 1422, a circuit/module for outputting 1424, a circuit/module for invoking 1426, a circuit/module for determining 1428, a circuit/module for comparing 1430, a circuit/module for assigning 1432, a circuit/module for generating 1434, or a circuit/module for selecting 1436. In various implementations, the circuit/module for detecting 1420, the circuit/module for regenerating 1422, the circuit/module for outputting 1424 the circuit/module for invoking 1426, the circuit/module for determining 1428, the circuit/module for comparing 1430, the circuit/module for assigning 1432, the circuit/module for generating 1434, or the circuit/module for selecting 1436 may provide and/or incorporate, at least in part, the functionality described above for the first wireless communication device 202 (e.g., the scheduling policy selector 214, the grant regenerator 216, the reorder controller 218, or any combination thereof) of FIG. 2.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-13 and 15-17 in various implementations. As shown in FIG. 14, the storage medium 1404 may include one or more of code for detecting 1440, code for regenerating 1442, code for outputting 1444, code for invoking 1446, code for determining 1448, code for comparing 1450, code for assigning 1452, code for generating 1454, or code for selecting 1456. In various implementations, the code for detecting 1440, the code for regenerating 1442, the code for outputting 1444, the code for invoking 1446, the code for determining 1448, the code for comparing 1450, the code for assigning 1452, the code for generating 1454, or the code for selecting 1456 may be executed or otherwise used to provide the functionality described herein for the circuit/module for detecting 1420, the circuit/module for regenerating 1422, the circuit/module for outputting 1424 the circuit/module for invoking 1426, the circuit/module for determining 1428, the circuit/module for comparing 1430, the circuit/module for assigning 1432, the circuit/module for generating 1434, or the circuit/module for selecting 1436.

The circuit/module for detecting 1420 may include circuitry and/or programming (e.g., code for detecting 1440 stored on the storage medium 1404) adapted to perform several functions relating to, for example, detecting an out-of-order grant. In some aspects, the circuit/module for detecting 1420 (e.g., a means for detecting) may correspond to, for example, a processing circuit.

Initially, the circuit/module for detecting 1420 may obtain information upon which the detection is to be based. For example, the circuit/module for detecting 1420 may obtain packets (e.g., from the memory device 1408, or some other component of the apparatus 1400) from a higher protocol layer. The circuit/module for detecting 1420 may then determine whether a grant associated with the packets is out-of-order (e.g., as discussed herein in conjunction with FIGS. 1-13). The circuit/module for detecting 1420 may then output an indication of the detection to the circuit/module for regenerating 1422, the memory device 1408, or some other component of the apparatus 1400.

The circuit/module for regenerating 1422 may include circuitry and/or programming (e.g., code for regenerating 1442 stored on the storage medium 1404) adapted to perform several functions relating to, for example, regenerating an out-of-order grant. In some aspects, the circuit/module for regenerating 1422 (e.g., a means for regenerating) may correspond to, for example, a processing circuit.

Initially, the circuit/module for regenerating 1422 may obtain an indication that there is an out-of-order grant (e.g., from the circuit/module for detecting 1420, the memory device 1408, or some other component of the apparatus 1400). The circuit/module for regenerating 1422 may then regenerate the out-of-order grant to provide an in-order grant (e.g., as discussed herein in conjunction with FIGS. 1-13). For example, the circuit/module for regenerating 1422 may cancel the out-of-order grant and generate an in-order grant. The circuit/module for regenerating 1422 may then provide the in-order grant to the circuit/module for outputting 1424, the memory device 1408, or some other component of the apparatus 1400.

The circuit/module for outputting 1424 may include circuitry and/or programming (e.g., code for outputting 1444 stored on the storage medium 1404) adapted to perform several functions relating to, for example, outputting (e.g., sending or transmitting) information. In some implementations, the circuit/module for outputting 1424 may obtain information (e.g., from the circuit/module for regenerating 1422, the memory device 1408, or some other component of the apparatus 1400) and process the information (e.g., encode the information for transmission). In some scenarios, the circuit/module for outputting 1424 sends the information to another component (e.g., the transmitter 1414, the communication interface 1402, or some other component) that will send the information to another device. In some scenarios (e.g., if the circuit/module for outputting 1424 includes a transmitter), the circuit/module for outputting 1424 transmits the information directly to another device (e.g., the ultimate destination) via radio frequency signaling or some other type of signaling suitable for the applicable communication medium.

The circuit/module for outputting 1424 (e.g., a means for outputting) may take various forms. In some aspects, the circuit/module for outputting 1424 may correspond to, for example, a processing circuit as discussed herein. In some aspects, the circuit/module for outputting 1424 may correspond to, for example, an interface (e.g., a bus interface, a send interface, or some other type of signal interface), a communication device, a transceiver, a transmitter, or some other similar component as discussed herein. In some implementations, the communication interface 1402 includes the circuit/module for outputting 1424 and/or the code for outputting 1444. In some implementations, the circuit/module for outputting 1424 and/or the code for outputting 1444 is configured to control the communication interface 1402 (e.g., a transceiver or a transmitter) to transmit information.

The circuit/module for invoking 1426 may include circuitry and/or programming (e.g., code for invoking 1436 stored on the storage medium 1404) adapted to perform several functions relating to, for example, triggering an operation. In some aspects, the circuit/module for invoking 1426 (e.g., a means for invoking) may correspond to, for example, a processing circuit.

In some aspects, the circuit/module for invoking 1426 may obtain information upon which the invoking is to be based. For example, the circuit/module for invoking 1426 may obtain information regarding a channel busy rate, a timing margin, a frequency of data unit fragmentation, a memory constraint, or some other condition (e.g., as discussed herein in conjunction with FIGS. 1-13). The circuit/module for invoking 1426 may then trigger an operation (e.g., regeneration, an assignment, etc.) based on the information (e.g., as discussed herein in conjunction with FIGS. 1-13).

The circuit/module for determining 1428 may include circuitry and/or programming (e.g., code for determining 1448 stored on the storage medium 1404) adapted to perform several functions relating to, for example, determining a condition. In some aspects, the circuit/module for determining 1428 (e.g., a means for determining) may correspond to, for example, a processing circuit.

Initially, the circuit/module for determining 1428 may obtain information upon which the determination is to be based. For example, the circuit/module for determining 1428 may obtain information (e.g., from the memory device 1408, or some other component of the apparatus 1400) regarding a channel busy rate, a timing margin, a frequency of data unit fragmentation, a memory constraint, a metric, a traffic condition, or some other condition. The circuit/module for determining 1428 may then make the determination based on the obtained information (e.g., as discussed herein in conjunction with FIGS. 1-13). The circuit/module for determining 1428 may then output an indication of the determination to the circuit/module for comparing 1430, the circuit/module for selecting 1436, the memory device 1408, or some other component of the apparatus 1400.

The circuit/module for comparing 1430 may include circuitry and/or programming (e.g., code for comparing 1450 stored on the storage medium 1404) adapted to perform several functions relating to, for example, comparing information. In some aspects, the circuit/module for comparing 1430 (e.g., a means for comparing) may correspond to, for example, a processing circuit.

Initially, the circuit/module for comparing 1430 may obtain information upon which the comparison is to be based. For example, the circuit/module for comparing 1430 may obtain information (e.g., from the circuit/module for determining 1428, the memory device 1408, or some other component of the apparatus 1400) regarding a channel busy rate, a timing margin, a frequency of data unit fragmentation, a memory constraint, a metric, or some other condition. In some scenarios, the circuit/module for comparing 1430 compares the obtained information with a threshold. The circuit/module for comparing 1430 then determines whether the information is less than, equal to, or greater than the threshold (e.g., by performing a subtraction operation). The circuit/module for comparing 1430 may then output the result of this determination (e.g., to the circuit/module for invoking 1426, the memory device 1408, or some other component of the apparatus 1400).

The circuit/module for assigning 1432 may include circuitry and/or programming (e.g., code for assigning 1452 stored on the storage medium 1404) adapted to perform several functions relating to, for example, assigning information. In some aspects, the circuit/module for assigning 1432 (e.g., a means for assigning) may correspond to, for example, a processing circuit.

Initially, the circuit/module for assigning 1432 may obtain information to be assigned. For example, the circuit/module for assigning 1432 may generate an out-of-order sequence number. The circuit/module for assigning 1432 may then associate this information with a designated target. For example, the circuit/module for assigning 1432 may assign an out-of-order sequence number to an out-of-order grant (e.g., by outputting an indication to the memory device 1408 or some other component of the apparatus 1400).

The circuit/module for generating 1434 may include circuitry and/or programming (e.g., code for generating 1454 stored on the storage medium 1404) adapted to perform several functions relating to, for example, generating an indication. In some aspects, the circuit/module for generating 1434 (e.g., a means for generating) may correspond to, for example, a processing circuit.

Initially, the circuit/module for generating 1434 may obtain information upon which the generation is to be based. For example, the circuit/module for generating 1434 may obtain information (e.g., from the memory device 1408, or some other component of the apparatus 1400) that specifies how an indication is to be generated (e.g., indicative of a particular period of time). The circuit/module for generating 1434 may then generate the indication based on the obtained information. For example, the circuit/module for generating 1434 may generate an indication of a period of time for reordering data units as discussed herein (e.g., in conjunction with FIGS. 1-13). The circuit/module for generating 1434 may then output the indication to the circuit/module for outputting 1424, the communication interface 1402, the memory device 1408, or some other component of the apparatus 1400.

The circuit/module for selecting 1436 may include circuitry and/or programming (e.g., code for selecting 1456 stored on the storage medium 1404) adapted to perform several functions relating to, for example, selecting a scheduling policy. In some aspects, the circuit/module for selecting 1436 (e.g., a means for selecting a coding rate) may correspond to, for example, a processing circuit.

The circuit/module for selecting 1436 may select a scheduling policy based on one or more inputs. For example, the circuit/module for selecting 1436 may select a scheduling policy based on a traffic condition such as traffic congestion, a timing margin for regenerating at least one out-of-order grant, a frequency of data unit fragmentation, a percentage of grants that are out-of-order, a quantity of grants that are out-of-order, a memory constraint, or any combination thereof. Thus, the circuit/module for selecting 1436 may initially obtain input information (e.g., from the circuit/module for determining 1428, the memory device 1408, or some other component of the apparatus 1400). The circuit/module for circuit/module for selecting 1436 can thus determine the scheduling policy to be used based on the appropriate input (e.g., as discussed herein in conjunction with FIGS. 1-13). The circuit/module for selecting 1436 may then output an indication of the selection (e.g., to the communication interface 1402, the memory device 1408, or some other component of the apparatus 1400).

First Example Process

Figure 15:
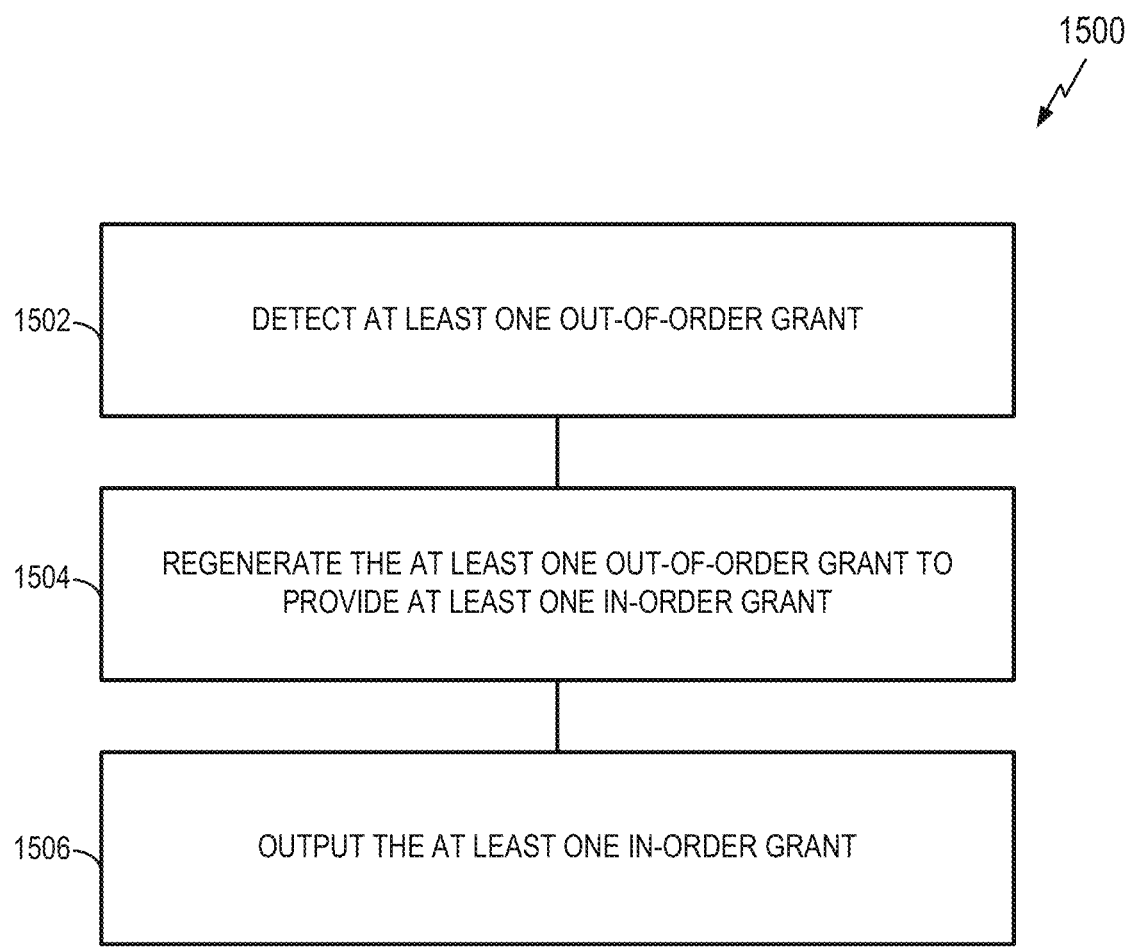
FIG. 15 is a flowchart illustrating an example of a process for regenerating grants in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a UE, an access terminal, a gNB, a TRP, a base station, or some other suitable apparatus. Of course, in various aspects within the scope of the disclosure, the process 1500 may be implemented by any suitable apparatus capable of supporting communication-related operations.

At block 1502, an apparatus (e.g., a UE) detects at least one out-of-order grant. For example, the apparatus may determine that a grant for a later data unit was scheduled prior to a grant for an earlier data unit.

The at least one out-of-order grant may take different forms in different implementations. In some aspects, the at least one in-order grant may be for Sidelink traffic. In some aspects, the at least one in-order grant may be for vehicle-to-anything traffic.

In some implementations, the circuit/module for detecting 1420 of FIG. 14 performs the operations of block 1502. In some implementations, the code for detecting 1440 of FIG. 14 is executed to perform the operations of block 1502.

At block 1504, the apparatus regenerates the at least one out-of-order grant to provide at least one in-order grant. In some aspects, the regeneration of the at least one out-of-order grant may include: canceling the at least one out-of-order grant; and generating the at least one in-order grant (e.g., scheduling the grants in the proper order). In some aspects, the regeneration of the at least one out-of-order grant may be performed at a media access control (MAC) protocol layer.

In some implementations, the circuit/module for regenerating 1422 of FIG. 14 performs the operations of block 1504. In some implementations, the code for regenerating 1442 of FIG. 14 is executed to perform the operations of block 1504.

The regeneration of the at least one out-of-order grant may be invoked based on different conditions in different implementations.

In some aspects, the process 1500 may further include invoking the regeneration of the at least one out-of-order grant based on a traffic condition. In some aspects, the traffic condition may include at least one of traffic congestion, a timing margin for regenerating the at least one out-of-order grant, a frequency of data unit fragmentation, a percentage of grants that are out-of-order, a quantity of grants that are out-of-order, a memory constraint, or any combination thereof. In some aspects, the data unit may include (e.g., may be) a radio link control (RLC) packet data unit (PDU). In some implementations, the circuit/module for invoking 1426 of FIG. 14 performs this invoking operation. In some implementations, the code for invoking 1446 of FIG. 14 is executed to perform this invoking operation.

In some aspects, the process 1500 may further include determining a channel busy rate and comparing the channel busy rate to a threshold. In this case, the regeneration of the at least one out-of-order grant may be invoked if the channel busy rate is less than or equal to the threshold. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1500 may further include determining a timing margin for rescheduling grants for queued data and comparing the timing margin to a threshold. In this case, the regeneration of the at least one out-of-order grant may be invoked if the timing margin is greater than or equal to the threshold. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1500 may further include determining a frequency of data unit fragmentations and comparing the frequency of data unit fragmentations to a threshold. In this case, the regeneration of the at least one out-of-order grant may be invoked if the frequency of data unit fragmentations is greater than or equal to the threshold. In some aspects, the determination of the frequency of data unit fragmentations may include receiving an indication of the frequency of data unit fragmentations reported by at least one receiver. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1500 may further include determining a memory constraint associated with at least one receiver and comparing the memory constraint to a threshold. In this case, the regeneration of the at least one out-of-order grant may be invoked if the memory constraint is greater than or equal to the threshold. In some aspects, the determination of the memory constraint may include receiving an indication of the memory constraint reported by the at least one receiver. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

At block 1506, the apparatus outputs the at least one in-order grant. For example, the apparatus may transmit the at least one out-of-order grant. As another example, the apparatus may broadcast the at least one out-of-order grant.

In some implementations, the circuit/module for outputting 1424 of FIG. 14 performs the operations of block 1506. In some implementations, the code for outputting 1444 of FIG. 14 is executed to perform the operations of block 1506.

In some aspects, the process 1500 may include any combination of the above operations and/or features.

Second Example Process

Figure 16:
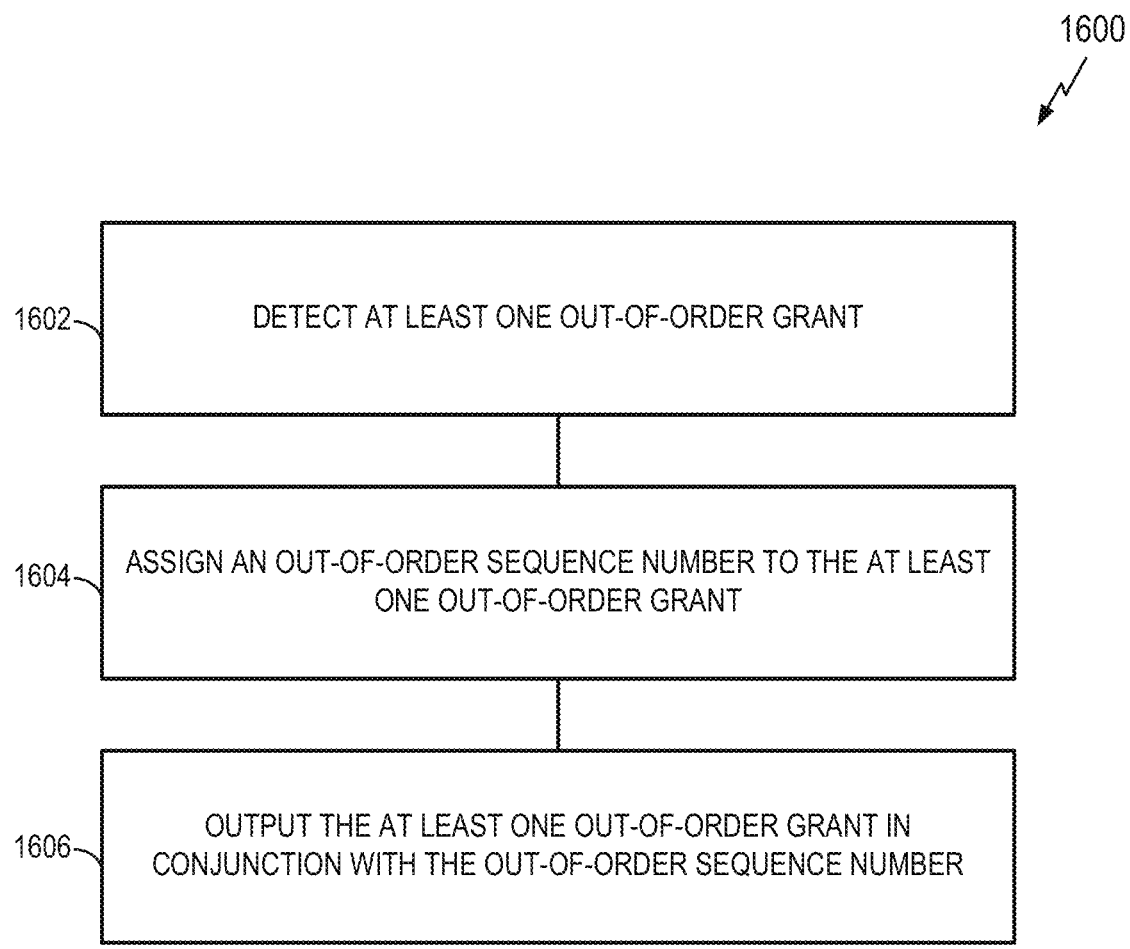
FIG. 16 is a flowchart illustrating an example of a process for assigning out-of-order sequence numbers in accordance with some aspects of the disclosure.

FIG. 16 illustrates a process 1600 for communication in accordance with some aspects of the disclosure. The process 1600 may take place within a processing circuit (e.g., the processing circuit 1410 of FIG. 14), which may be located in a UE, an access terminal, a gNB, a TRP, a base station, or some other suitable apparatus. Of course, in various aspects within the scope of the disclosure, the process 1600 may be implemented by any suitable apparatus capable of supporting communication-related operations.

At block 1602, an apparatus (e.g., a UE) detects at least one out-of-order grant. For example, the apparatus may determine that a grant for a later data unit was scheduled prior to a grant for an earlier data unit.

The at least one out-of-order grant may take different forms in different implementations. In some aspects, the at least one in-order grant may be for Sidelink traffic. In some aspects, the at least one in-order grant may be for vehicleto-anything traffic. In some aspects, the at least one in-order grant may be generated at a media access control (MAC) protocol layer.

In some implementations, the circuit/module for detecting 1420 of FIG. 14 performs the operations of block 1602. In some implementations, the code for detecting 1440 of FIG. 14 is executed to perform the operations of block 1602.

At block 1604, the apparatus assigns an out-of-order sequence number to the at least one out-of-order grant. For example, the apparatus may reorder the sequence numbers associated with a set of grants. In some aspects, the sequence number may include (e.g., may be) a radio link control (RLC) sequence number.

In some implementations, the circuit/module for assigning 1432 of FIG. 14 performs the operations of block 1604. In some implementations, the code for assigning 1452 of FIG. 14 is executed to perform the operations of block 1604.

The assignment of the at least one out-of-order grant may be invoked based on different conditions in different implementations.

In some aspects, the process 1600 may further include invoking the assignment of the out-of-order sequence number based on a traffic condition. In some aspects, the traffic condition may include at least one of traffic congestion, a timing margin for regenerating the at least one out-of-order grant, a frequency of data unit fragmentation, a metric based on grants that are out-of-order, a memory constraint, or any combination thereof. In some implementations, the circuit/module for invoking 1426 of FIG. 14 performs this invoking operation. In some implementations, the code for invoking 1446 of FIG. 14 is executed to perform this invoking operation.

In some aspects, the process 1600 may further include determining a timing margin for rescheduling grants for queued data and comparing the timing margin to a threshold. In this case, the assignment of the out-of-order sequence number may be invoked if the timing margin is less than or equal to the threshold. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1600 may further include determining a frequency of data unit fragmentations and comparing the frequency of data unit fragmentations to a threshold. In this case, the assignment of the out-of-order sequence number may be invoked if the frequency of data unit fragmentations is greater than or equal to the threshold. In some aspects, the determination of the frequency of data unit fragmentations may include receiving an indication of the frequency of data unit fragmentations reported by at least one receiver. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1600 may further include determining a memory constraint associated with at least one receiver and comparing the memory constraint to a threshold. In this case, the assignment of the out-of-order sequence number may be invoked if the memory constraint is less than or equal to the threshold. In some aspects, the determination of the memory constraint may include receiving an indication of the memory constraint reported by the at least one receiver. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1600 may further include determining a metric based on grants that are out-of-order and comparing the metric to a threshold. In this case, the assignment of the out-of-order sequence number may be invoked if the metric is less than or equal to the threshold. In some aspects, the metric may include (e.g., may be) a percentage of grants that are out-of-order. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

In some aspects, the process 1600 may further include determining a channel busy rate and comparing the channel busy rate to a threshold. In this case, the assignment of the out-of-order sequence number may be invoked if the channel busy rate is greater than or equal to the threshold. In some implementations, the circuit/module for determining 1428 of FIG. 14 performs this determination operation, the circuit/module for comparing 1430 of FIG. 14 performs this comparison operation, and the circuit/module for invoking 1426 of FIG. 14 performs this invoking operation. In some implementations, the code for determining 1448 of FIG. 14 is executed to perform this determination operation, the code for comparing 1450 of FIG. 14 is executed to perform this comparison operation, and the code for invoking 1446 of FIG. 14 is executed to perform this invoking operation.

At block 1606, the apparatus outputs the at least one out-of-order grant in conjunction with the out-of-order sequence number. For example, the apparatus may transmit the at least one out-of-order grant. As another example, the apparatus may broadcast the at least one out-of-order grant.

In some implementations, the circuit/module for outputting 1424 of FIG. 14 performs the operations of block 1606. In some implementations, the code for outputting 1444 of FIG. 14 is executed to perform the operations of block 1606.

In some aspects, the process 1600 may further include generating an indication of a period of time for reordering data units and outputting the indication. In this case, the generation of the indication may be based on a maximum pending time for over-the-air scheduled transmissions of data units. In some implementations, the circuit/module for generating 1434 of FIG. 14 performs this generating operation and the circuit/module for outputting 1424 of FIG. 14 performs this outputting operation. In some implementations, the code for generating 1454 of FIG. 14 is executed to perform this generating operation and the code for outputting 1444 of FIG. 14 is executed to perform this outputting operation.

In some aspects, the process 1600 may include any combination of the above operations and/or features.

Third Example Process

Figure 17:
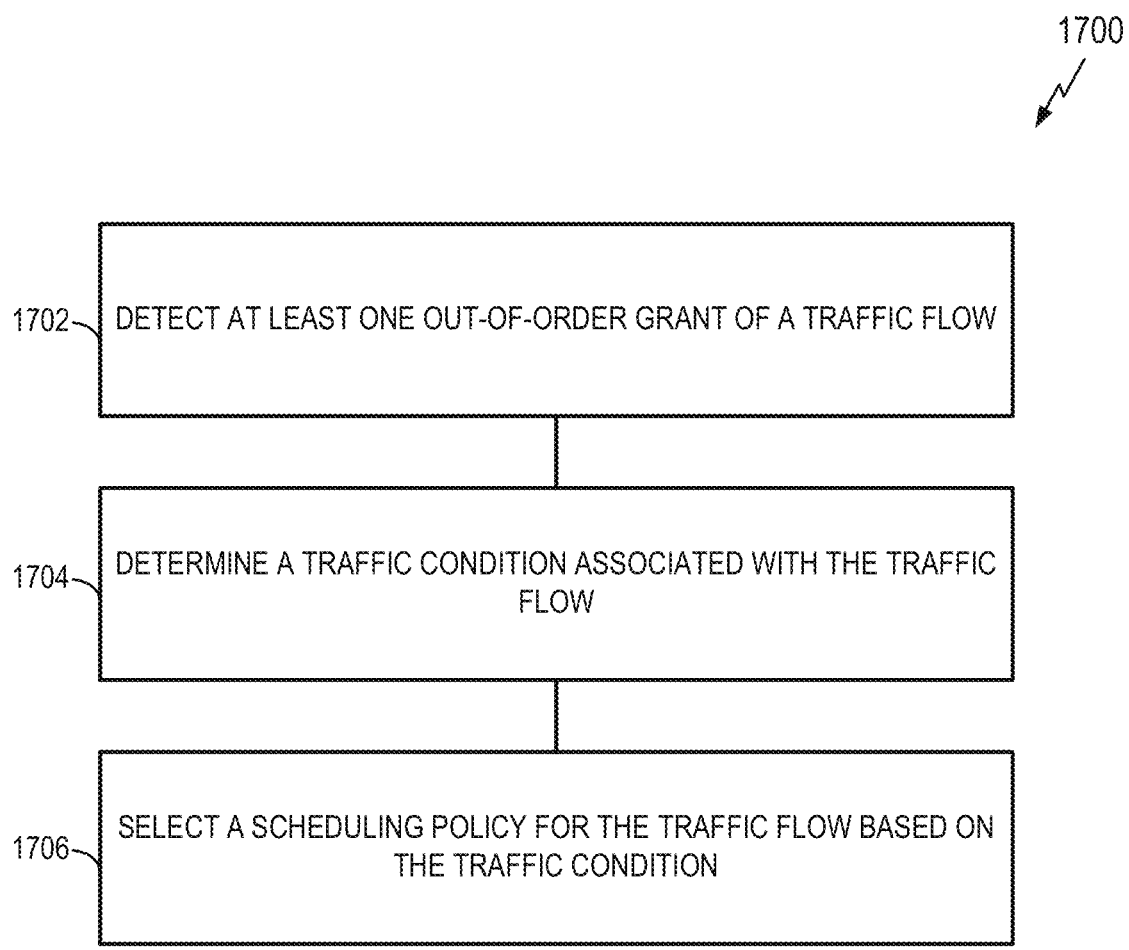
FIG. 17 is a flowchart illustrating an example of a process for selecting a scheduling policy in accordance with some aspects of the disclosure.

FIG. 17 illustrates a process 1700 for communication in accordance with some aspects of the disclosure. The process 1700 may take place within a processing circuit (e.g., the processing circuit 1410 of FIG. 14), which may be located in a UE, an access terminal, a gNB, a TRP, a base station, or some other suitable apparatus. Of course, in various aspects within the scope of the disclosure, the process 1700 may be implemented by any suitable apparatus capable of supporting communication-related operations.

At block 1702, an apparatus (e.g., a UE) detects at least one out-of-order grant of a traffic flow. For example, the apparatus may determine that a grant for a later data unit of the traffic flow was scheduled prior to a grant for an earlier data unit of the traffic flow.

In some implementations, a traffic flow may correspond to a flow of packets between devices. In some implementations, a traffic flow may correspond to a flow that uses the same Radio Link Control Unacknowledged Mode (RLC UM) sequence (e.g., packets that use the same sequence number space).

In some implementations, the circuit/module for detecting 1420 of FIG. 14 performs the operations of block 1702. In some implementations, the code for detecting 1440 of FIG. 14 is executed to perform the operations of block 1702.

At block 1704, the apparatus determines a traffic condition associated with the traffic flow. In some aspects, the traffic condition may include at least one of traffic congestion, a timing margin for regenerating the at least one out-of-order grant, a frequency of data unit fragmentation, a metric based on grants that are out-of-order, a memory constraint, a maximum quantity of retransmissions, or any combination thereof.

In some implementations, the circuit/module for determining 1428 of FIG. 14 performs the operations of block 1704. In some implementations, the code for determining 1448 of FIG. 14 is executed to perform the operations of block 1704.

At block 1706, the apparatus selects a scheduling policy for the traffic flow based on the traffic condition. In some aspects, the process 1700 may further include using the selected scheduling policy to schedule the at least one out-of-order grant. The selection of the scheduling policy may take different forms in different implementations.

In some aspects, the selection of the scheduling policy may include selecting: a first scheduling policy for regenerating out-of-order grants, a second scheduling policy for assigning out-of-order sequence numbers, or a third scheduling policy for transmitting bytes of message in sequence based on at least one grant size.

In some aspects, the selection of the scheduling policy may include selecting a scheduling policy for regenerating out-of-order grants if: a frequency of data unit fragmentations is greater than or equal to a first threshold; and a timing margin for rescheduling grants for queued data is less than or equal to a second threshold.

In some aspects, the selection of the scheduling policy may include selecting a scheduling policy for regenerating out-of-order grants if: a memory constraint associated with at least one receiver is greater than or equal to a first threshold; and a timing margin for rescheduling grants for queued data is less than or equal to a second threshold.

In some aspects, the selection of the scheduling policy may include selecting a scheduling policy for assigning out-of-order sequence numbers if: a memory constraint associated with at least one receiver is less than or equal to a first threshold; and a timing margin for rescheduling grants for queued data is greater than or equal to a second threshold.

In some aspects, the selection of the scheduling policy may include selecting a scheduling policy for assigning out-of-order sequence numbers if: a memory constraint associated with at least one receiver is less than or equal to a first threshold; a timing margin for rescheduling grants for queued data is greater than or equal to a second threshold; and a channel busy rate is greater than or equal to a third threshold.

In some aspects, the selection of the scheduling policy may include selecting a scheduling policy for assigning out-of-order sequence numbers if: a memory constraint associated with at least one receiver is less than or equal to a first threshold; and a frequency of data unit fragmentations is greater than or equal to a second threshold.

In some aspects, the selection of the scheduling policy may include selecting a scheduling policy for assigning out-of-order sequence numbers if: a timing margin for rescheduling grants for queued data is less than or equal to a first threshold; and a frequency of data unit fragmentations is greater than or equal to a second threshold.

In some aspects, the selection of the scheduling policy may include selecting a scheduling policy for transmitting messages based on at least one grant size if a memory constraint associated with at least one receiver is greater than or equal to a first threshold.

In some aspects, the selection of the scheduling policy may include selecting a scheduling policy for transmitting messages based on at least one grant size if: a timing margin for rescheduling grants for queued data is less than or equal to a first threshold; and a channel busy rate is greater than or equal to a second threshold.

In some aspects, the traffic condition may include relative sizes of messages. In this case, the selection of the scheduling policy may include, if the relative sizes are within a threshold range, selecting a scheduling policy for transmitting messages based on at least one grant size.

In some implementations, the circuit/module for selecting 1436 of FIG. 14 performs the operations of block 1706. In some implementations, the code for selecting 1456 of FIG. 14 is executed to perform the operations of block 1706.

In some aspects, the process 1700 may include any combination of the above operations and/or features.

Second Example Apparatus

Figure 18:
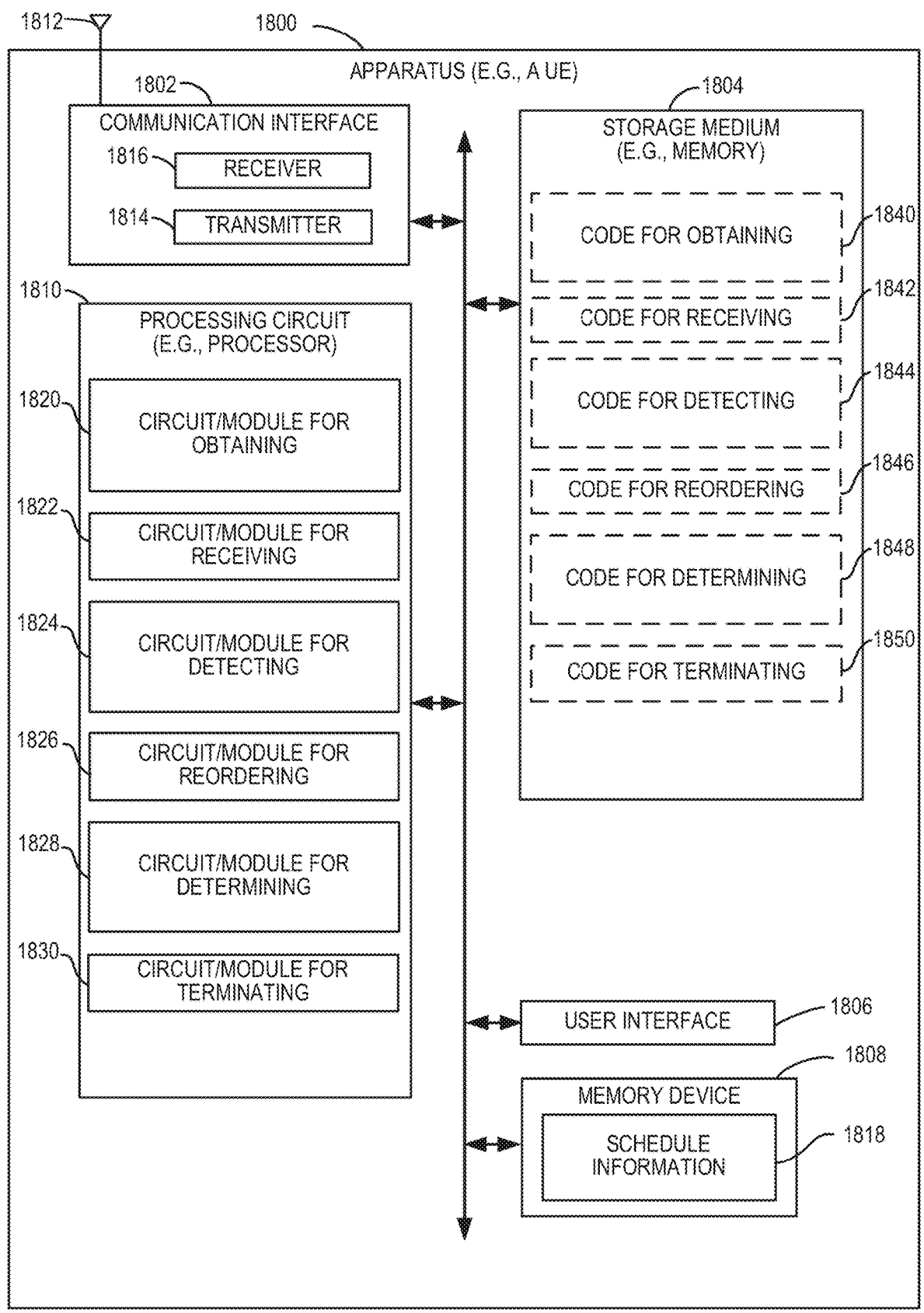
FIG. 18 is a block diagram illustrating another example hardware implementation for an apparatus (e.g., an electronic device) that can support communication in accordance with some aspects of the disclosure.

FIG. 18 illustrates a block diagram of an example hardware implementation of an apparatus 1800 configured to communicate (e.g., using OoO scheduling) according to one or more aspects of the disclosure. The apparatus 1800 could embody or be implemented within a UE, a gNB, a transmit receive point (TRP), an access point, or some other type of device that supports wireless communication with scheduling as taught herein. In various implementations, the apparatus 1800 could embody or be implemented within a base station, an access terminal, or some other type of device. In various implementations, the apparatus 1800 could embody or be implemented within a mobile phone, a smart phone, a tablet, a portable computer, a personal computer, a sensor, an alarm, a vehicle, a machine, a server, a network entity, an entertainment device, a medical device, or any other electronic device having circuitry.

The apparatus 1800 includes a communication interface 1802 (e.g., at least one transceiver), a storage medium 1804, a user interface 1806, a memory device 1808 (e.g., storing schedule information 1818), and a processing circuit 1810 (e.g., at least one processor). In various implementations, the user interface 1806 may include one or more of: a keypad, a display, a speaker, a microphone, a touchscreen display, of some other circuitry for receiving an input from or sending an output to a user. The communication interface 1802 may be coupled to one or more antennas 1812, and may include a transmitter 1814 and a receiver 1816. In general, the components of FIG. 18 may be similar to corresponding components of the apparatus 1400 of FIG. 14.

According to one or more aspects of the disclosure, the processing circuit 1810 may be adapted to perform any or all of the features, processes, functions, operations and/or routines for any or all of the apparatuses described herein. For example, the processing circuit 1810 may be configured to perform any of the steps, functions, and/or processes described with respect to FIGS. 1-13 and 19. As used herein, the term "adapted" in relation to the processing circuit 1810 may refer to the processing circuit 1810 being one or more of configured, used, implemented, and/or programmed to perform a particular process, function, operation and/or routine according to various features described herein.

The processing circuit 1810 may be a specialized processor, such as an application specific integrated circuit (ASIC) that serves as a means for (e.g., structure for) carrying out any one of the operations described in conjunction with FIGS. 1-13 and 19. The processing circuit 1810 may serve as one example of a means for transmitting and/or a means for receiving. In various implementations, the processing circuit 1810 may provide and/or incorporate, at least in part, the functionality described above for the second wireless communication device 204 (e.g., the reorder controller 220) of FIG. 2.

According to at least one example of the apparatus 1800, the processing circuit 1810 may include one or more of a circuit/module for obtaining 1820, a circuit/module for receiving 1822, a circuit/module for detecting 1824, a circuit/module for reordering 1826, a circuit/module for determining 1828, or a circuit/module for terminating 1830. In various implementations, the circuit/module for obtaining 1820, the circuit/module for receiving 1822, the circuit/module for detecting 1824, the circuit/module for reordering 1826, the circuit/module for determining 1828, or the circuit/module for terminating 1830 may provide and/or incorporate, at least in part, the functionality described above for the second wireless communication device 204 (e.g., the reorder controller 220) of FIG. 2.

As mentioned above, programming stored by the storage medium 1804, when executed by the processing circuit 1810, causes the processing circuit 1810 to perform one or more of the various functions and/or process operations described herein. For example, the programming may cause the processing circuit 1810 to perform the various functions, steps, and/or processes described herein with respect to FIGS. 1-13 and 19 in various implementations. As shown in FIG. 18, the storage medium 1804 may include one or more of code for obtaining 1840, code for receiving 1842, code for detecting 1844, code for reordering 1846, code for determining 1848, or code for terminating 1850. In various implementations, the code for obtaining 1840, the code for receiving 1842, the code for detecting 1844, the code for reordering 1846, the code for determining 1848, or the code for terminating 1850 may be executed or otherwise used to provide the functionality described herein for the circuit/module for obtaining 1820, the circuit/module for receiving 1822, the circuit/module for detecting 1824, the circuit/module for reordering 1826, the circuit/module for determining 1828, or the circuit/module for terminating 1830.

The circuit/module for obtaining 1820 may include circuitry and/or programming (e.g., code for obtaining 1840 stored on the storage medium 1804) adapted to perform several functions relating to, for example, obtaining information. In some scenarios, the circuit/module for obtaining 1820 may receive information (e.g., from the communication interface 1802, the memory device 1808, or some other component of the apparatus 1800) and process the information. The circuit/module for obtaining 1820 may then output the information to another component of the apparatus 1800 (e.g., the circuit/module for detecting 1824, the memory device 1808, or some other component).

The circuit/module for obtaining 1820 (e.g., a means for obtaining) may take various forms. In some aspects, the circuit/module for obtaining 1820 may correspond to, for example, a processing circuit as discussed herein. In some aspects, the circuit/module for obtaining 1820 may correspond to, for example, an interface (e.g., a bus interface, a receive interface, or some other type of signal interface), a communication device, a transceiver, a receiver, or some other similar component as discussed herein. In some implementations, the communication interface 1802 includes the circuit/module for obtaining 1820 and/or the code for obtaining 1840. In some implementations, the circuit/module for obtaining 1820 and/or the code for obtaining 1840 is configured to control the communication interface 1802 (e.g., a transceiver or a receiver) to communicate the information.

The circuit/module for receiving 1822 may include circuitry and/or programming (e.g., code for receiving 1842 stored on the storage medium 1804) adapted to perform several functions relating to, for example, receiving information. In some scenarios, the circuit/module for receiving 1822 may obtain information (e.g., from the communication interface 1802, the memory device, or some other component of the apparatus 1800) and processes (e.g., decodes) the information. In some scenarios (e.g., if the circuit/module for receiving 1822 is or includes an RF receiver), the circuit/module for receiving 1822 may receive information directly from a device that transmitted the information. In either case, the circuit/module for receiving 1822 may output the obtained information to another component of the apparatus 1800 (e.g., the circuit/module for detecting 1824, the memory device 1808, or some other component).

The circuit/module for receiving 1822 (e.g., a means for receiving) may take various forms. In some aspects, the circuit/module for receiving 1822 may correspond to, for example, an interface (e.g., a bus interface, a send/receive interface, or some other type of signal interface), a communication device, a transceiver, a receiver, or some other similar component as discussed herein. In some implementations, the communication interface 1802 includes the circuit/module for receiving 1822 and/or the code for receiving 1842. In some implementations, the circuit/module for receiving 1822 and/or the code for receiving 1842 is configured to control the communication interface 1802 (e.g., a transceiver or a receiver) to receive information.

The circuit/module for detecting 1824 may include circuitry and/or programming (e.g., code for detecting 1844 stored on the storage medium 1804) adapted to perform several functions relating to, for example, detecting a condition. In some aspects, the circuit/module for detecting 1824 (e.g., a means for detecting) may correspond to, for example, a processing circuit.

Initially, the circuit/module for detecting 1824 may obtain information upon which the detection is to be based. For example, the circuit/module for detecting 1824 may obtain packets (e.g., from the memory device 1808, or some other component of the apparatus 1800) from a lower protocol layer. The circuit/module for detecting 1824 may then determine whether a sequence number associated with the packets is out-of-order (e.g., as discussed herein in conjunction with FIGS. 1-13). The circuit/module for detecting 1824 may then output an indication of the detection to the circuit/module for reordering 1826, the memory device 1808, or some other component of the apparatus 1800.

The circuit/module for reordering 1826 may include circuitry and/or programming (e.g., code for reordering 1846 stored on the storage medium 1804) adapted to perform several functions relating to, for example, reordering information. In some aspects, the circuit/module for reordering 1826 (e.g., a means for reordering) may correspond to, for example, a processing circuit.

Initially, the circuit/module for reordering 1826 may obtain an indication that reordering should occur (e.g., from the circuit/module for detecting 1824, the memory device 1808, or some other component of the apparatus 1800) as well as information to be reordered (e.g., from the circuit/module for receiving 1822, the memory device 1808, or some other component of the apparatus 1800). For example, reordering may be indicated if an out-of-order sequence number is detected. In this case, the circuit/module for reordering 1826 may reorder at least one data unit to account for the out-of-order sequence number (e.g., as discussed herein in conjunction with FIGS. 1-13).

The circuit/module for determining 1828 may include circuitry and/or programming (e.g., code for determining 1848 stored on the storage medium 1804) adapted to perform several functions relating to, for example, determining a condition. In some aspects, the circuit/module for determining 1828 (e.g., a means for determining) may correspond to, for example, a processing circuit.

Initially, the circuit/module for determining 1828 may obtain information upon which the determination is to be based. For example, the circuit/module for determining 1828 may obtain received packets or information about the packets (e.g., from the memory device 1808, or some other component of the apparatus 1800). The circuit/module for determining 1828 may then make the determination (e.g., regarding packet priority, traffic congestion, or some other condition) based on the obtained information (e.g., as discussed herein in conjunction with FIGS. 1-13). The circuit/module for determining 1828 may then output an indication of the determination to the circuit/module for terminating 1830, the memory device 1808, or some other component of the apparatus 1800.

The circuit/module for terminating 1830 may include circuitry and/or programming (e.g., code for terminating 1850 stored on the storage medium 1804) adapted to perform several functions relating to, for example, terminating an operation. In some aspects, the circuit/module for terminating 1830 (e.g., a means for terminating) may correspond to, for example, a processing circuit.

In some aspects, the circuit/module for terminating 1830 may obtain information upon which the termination is to be based. For example, the circuit/module for terminating 1830 may obtain information regarding packet priority, traffic congestion, or some other condition (e.g., as discussed herein in conjunction with FIGS. 1-13). The circuit/module for terminating 1830 may then stop an operation (e.g., reordering) based on the information (e.g., as discussed herein in conjunction with FIGS. 1-13).

Fourth Example Process

Figure 19:
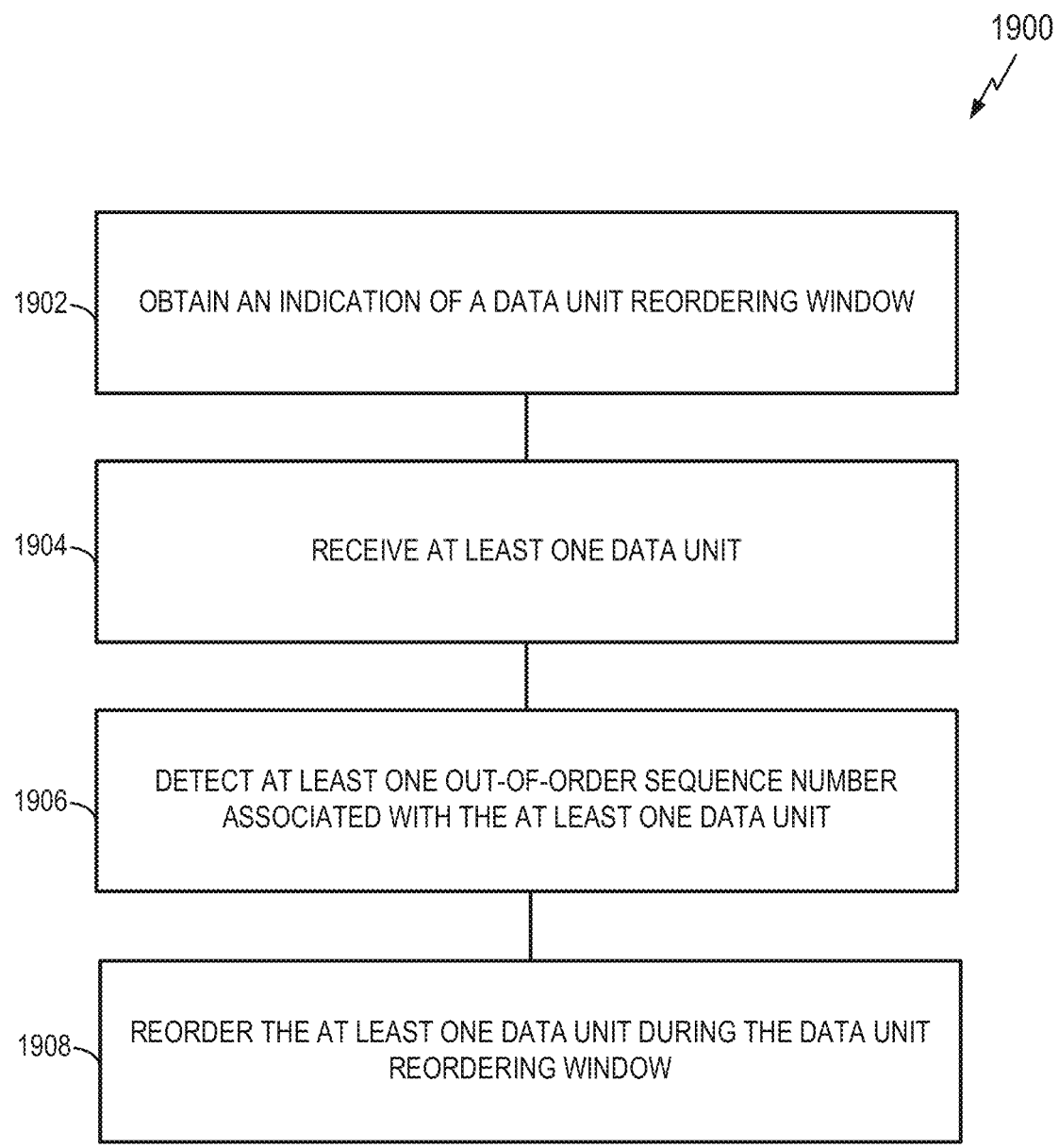
FIG. 19 is a flowchart illustrating an example of a process for reordering data units in accordance with some aspects of the disclosure.

FIG. 19 illustrates a process 1900 for communication in accordance with some aspects of the disclosure. The process 1900 may take place within a processing circuit (e.g., the processing circuit 1810 of FIG. 18), which may be located in a UE, an access terminal, a gNB, a TRP, a base station, or some other suitable apparatus. Of course, in various aspects within the scope of the disclosure, the process 1900 may be implemented by any suitable apparatus capable of supporting communication-related operations.

At block 1902, an apparatus (e.g., a UE) obtains an indication of a data unit reordering window. For example, the apparatus may receive the indication from another apparatus or retrieve the indication from a memory device.

In some aspects, the obtaining of the indication of the data unit reordering window may include receiving a data unit that includes the indication (e.g., t_reorder).

In some aspects, the obtaining of the indication of the data unit reordering window may include determining whether an indication of the data unit reordering window has been received and obtaining a default indication of the data unit reordering window if the indication of the data unit reordering window has not been received.

In some implementations, the circuit/module for obtaining 1820 of FIG. 18 performs the operations of block 1902. In some implementations, the code for obtaining 1840 of FIG. 18 is executed to perform the operations of block 1902.

At block 1904, the apparatus receives at least one data unit.

In some implementations, the circuit/module for receiving 1822 of FIG. 18 performs the operations of block 1904. In some implementations, the code for receiving 1842 of FIG. 18 is executed to perform the operations of block 1904.

At block 1906, the apparatus detects at least one out-of-order sequence number associated with the at least one data unit. For example, an earlier in time data unit may have a later sequence number than a later in time data unit.

In some implementations, the circuit/module for detecting 1824 of FIG. 18 performs the operations of block 1906. In some implementations, the code for detecting 1844 of FIG. 18 is executed to perform the operations of block 1906.

At block 1908, the apparatus reorders the at least one data unit during the data unit reordering window. For example, the apparatus may process the data units in the appropriate order.

In some implementations, the circuit/module for reordering 1826 of FIG. 18 performs the operations of block 1908. In some implementations, the code for reordering 1846 of FIG. 18 is executed to perform the operations of block 1908.

In some aspects, the process 1900 may further include determining at least one priority of at least one packet and terminating the reordering based on the at least one priority. In some implementations, the circuit/module for determining 1828 of FIG. 18 performs this determination operation and the circuit/module for terminating 1830 of FIG. 18 performs this termination operation. In some implementations, the code for determining 1848 of FIG. 18 is executed to perform this determination operation and the code for terminating 1850 of FIG. 18 is executed to perform this termination operation.

In some aspects, the process 1900 may further include determining an indication of traffic congestion and terminating the reordering if the indication of traffic congestion is greater than or equal to a threshold. In some implementations, the circuit/module for determining 1828 of FIG. 18 performs this determination operation and the circuit/module for terminating 1830 of FIG. 18 performs this termination operation. In some implementations, the code for determining 1848 of FIG. 18 is executed to perform this determination operation and the code for terminating 1850 of FIG. 18 is executed to perform this termination operation.

In some aspects, the process 1900 may include any combination of the above operations and/or features.

Further Aspects

A first aspect of the disclosure relates to a method, an apparatus for communication including a memory and a processor coupled to the memory, an apparatus for communication including means for functionality, and a non-transitory computer-readable medium storing computer-executable code as follows. The disclosure relates in some aspects to a method of communication, including: detecting at least one out-of-order grant; regenerating the at least one out-of-order grant to provide at least one in-order grant; and outputting the at least one in-order grant. The disclosure relates in some aspects to an apparatus for communication including: a memory; and a processor coupled to the memory, the processor and the memory configured to: detect at least one out-of-order grant; regenerate the at least one out-of-order grant to provide at least one in-order grant; and output the at least one in-order grant. The disclosure relates in some aspects to an apparatus for communication including: means for detecting at least one out-of-order grant; means for regenerating the at least one out-of-order grant to provide at least one in-order grant; and means for outputting the at least one in-order grant. The disclosure relates in some aspects to a non-transitory computer-readable medium storing computer-executable code, including code to: detect at least one out-of-order grant; regenerate the at least one out-of-order grant to provide at least one in-order grant; and output the at least one in-order grant. Other example aspects of the first aspect of the disclosure follow.

The regeneration of the at least one out-of-order grant may include: canceling the at least one out-of-order grant; and generating the at least one in-order grant. The regeneration of the at least one out-of-order grant may be performed at a media access control (MAC) protocol layer. The at least one in-order grant may be for Sidelink traffic. The at least one in-order grant may be for vehicle-to-anything traffic.

The method may further include invoking the regeneration of the at least one out-of-order grant based on a traffic condition. The processor and the memory may be further configured to: invoke the regeneration of the at least one out-of-order grant based on a traffic condition. The apparatus with means for functionality may further include means for invoking the regeneration of the at least one out-of-order grant based on a traffic condition. The non-transitory computer-readable medium may further include code to invoke the regeneration of the at least one out-of-order grant based on a traffic condition. The traffic condition may include at least one of traffic congestion, a timing margin for regenerating the at least one out-of-order grant, a frequency of data unit fragmentation, a percentage of grants that are out-of-order, a quantity of grants that are out-of-order, a memory constraint, or any combination thereof. The data unit may include a radio link control (RLC) packet data unit (PDU).

The method may further include: determining a channel busy rate; comparing the channel busy rate to a threshold; and invoking the regeneration of the at least one out-of-order grant if the channel busy rate is less than or equal to the threshold. The processor and the memory may be further configured to: determine a channel busy rate; compare the channel busy rate to a threshold; and invoke the regeneration of the at least one out-of-order grant if the channel busy rate is less than or equal to the threshold. The apparatus with means for functionality may further include: means for determining a channel busy rate; means for comparing the channel busy rate to a threshold; and means for invoking the regeneration of the at least one out-of-order grant if the channel busy rate is less than or equal to the threshold. The non-transitory computer-readable medium may further include code to: determine a channel busy rate; compare the channel busy rate to a threshold; and invoke the regeneration of the at least one out-of-order grant if the channel busy rate is less than or equal to the threshold.

The method may further include: determining a channel busy rate; comparing the channel busy rate to a threshold; and invoking the regeneration of the at least one out-of-order grant if the channel busy rate is less than or equal to the threshold. The processor and the memory may be further configured to: determine a channel busy rate; comparing the channel busy rate to a threshold; and invoke the regeneration of the at least one out-of-order grant if the channel busy rate is less than or equal to the threshold. The apparatus with means for functionality may further include: means for determining a channel busy rate; comparing the channel busy rate to a threshold; and means for invoking the regeneration of the at least one out-of-order grant if the channel busy rate is less than or equal to the threshold. The non-transitory computer-readable medium may further include code to: determine a channel busy rate; comparing the channel busy rate to a threshold; and invoke the regeneration of the at least one out-of-order grant if the channel busy rate is less than or equal to the threshold.

The method may further include: determining a timing margin for rescheduling grants for queued data; comparing the timing margin to a threshold; and invoking the regeneration of the at least one out-of-order grant if the timing margin is greater than or equal to the threshold. The processor and the memory may be further configured to: determine a timing margin for rescheduling grants for queued data; compare the timing margin to a threshold; and invoke the regeneration of the at least one out-of-order grant if the timing margin is greater than or equal to the threshold. The apparatus with means for functionality may further include: means for determining a timing margin for rescheduling grants for queued data; means for comparing the timing margin to a threshold; and means for invoking the regeneration of the at least one out-of-order grant if the timing margin is greater than or equal to the threshold. The non-transitory computer-readable medium may further include code to: determine a timing margin for rescheduling grants for queued data; compare the timing margin to a threshold; and invoke the regeneration of the at least one out-of-order grant if the timing margin is greater than or equal to the threshold.

The method may further include: determining a frequency of data unit fragmentations; comparing the frequency of data unit fragmentations to a threshold; and invoking the regeneration of the at least one out-of-order grant if the frequency of data unit fragmentations is greater than or equal to the threshold. The processor and the memory may be further configured to: determine a frequency of data unit fragmentations; compare the frequency of data unit fragmentations to a threshold; and invoke the regeneration of the at least one out-of-order grant if the frequency of data unit fragmentations is greater than or equal to the threshold. The apparatus with means for functionality may further include: means for determining a frequency of data unit fragmentations; means for comparing the frequency of data unit fragmentations to a threshold; and means for invoking the regeneration of the at least one out-of-order grant if the frequency of data unit fragmentations is greater than or equal to the threshold. The non-transitory computer-readable medium may further include code to: determine a frequency of data unit fragmentations; compare the frequency of data unit fragmentations to a threshold; and invoke the regeneration of the at least one out-of-order grant if the frequency of data unit fragmentations is greater than or equal to the threshold. The determination of the frequency of data unit fragmentations may include receiving an indication of the frequency of data unit fragmentations reported by at least one receiver.

The method may further include: determining a memory constraint associated with at least one receiver; comparing the memory constraint to a threshold; and invoking the regeneration of the at least one out-of-order grant if the memory constraint is greater than or equal to the threshold. The processor and the memory may be further configured to: determine a memory constraint associated with at least one receiver; compare the memory constraint to a threshold; and invoke the regeneration of the at least one out-of-order grant if the memory constraint is greater than or equal to the threshold. The apparatus with means for functionality may further include: means for determining a memory constraint associated with at least one receiver; means for comparing the memory constraint to a threshold; and means for invoking the regeneration of the at least one out-of-order grant if the memory constraint is greater than or equal to the threshold. The non-transitory computer-readable medium may further include code to: determine a memory constraint associated with at least one receiver; compare the memory constraint to a threshold; and invoke the regeneration of the at least one out-of-order grant if the memory constraint is greater than or equal to the threshold. The determination of the memory constraint may include receiving an indication of the memory constraint reported by the at least one receiver.

A second aspect of the disclosure relates to a method, an apparatus for communication including a memory and a processor coupled to the memory, an apparatus for communication including means for functionality, and a non-transitory computer-readable medium storing computer-executable code as follows. The disclosure relates in some aspects to a method of communication, including: detecting at least one out-of-order grant; assigning an out-of-order sequence number to the at least one out-of-order grant; and outputting the at least one out-of-order grant in conjunction with the out-of-order sequence number. The disclosure relates in some aspects to an apparatus for communication including: a memory; and a processor coupled to the memory, the processor and the memory configured to: detect at least one out-of-order grant; assign an out-of-order sequence number to the at least one out-of-order grant; and output the at least one out-of-order grant in conjunction with the out-of-order sequence number. The disclosure relates in some aspects to an apparatus for communication including: means for detecting at least one out-of-order grant; means for assigning an out-of-order sequence number to the at least one out-of-order grant; and means for outputting the at least one out-of-order grant in conjunction with the out-of-order sequence number. The disclosure relates in some aspects to a non-transitory computer-readable medium storing computer-executable code, including code to: detect at least one out-of-order grant; assign an out-of-order sequence number to the at least one out-of-order grant; and output the at least one out-of-order grant in conjunction with the out-of-order sequence number. Other example aspects of the second aspect of the disclosure follow.

The sequence number may include a radio link control (RLC) sequence number. The at least one out-of-order grant may be generated at a media access control (MAC) protocol layer. The at least one out-of-order grant may be for Sidelink traffic. The at least one out-of-order grant may be for vehicle-to-anything traffic.

The method may further include: invoking the assignment of the out-of-order sequence number based on a traffic condition. The processor and the memory may be further configured to: invoke the assignment of the out-of-order sequence number based on a traffic condition. The apparatus with means for functionality may further include: means for invoking the assignment of the out-of-order sequence number based on a traffic condition. The non-transitory computer-readable medium may further include code to: invoke the assignment of the out-of-order sequence number based on a traffic condition. The traffic condition may include at least one of traffic congestion, a timing margin for regenerating the at least one out-of-order grant, a frequency of data unit fragmentation, a metric based on grants that are out-of-order, a memory constraint, or any combination thereof.

The method may further include: determining a timing margin for rescheduling grants for queued data; comparing the timing margin to a threshold; and invoking the assignment of the out-of-order sequence number if the timing margin is less than or equal to the threshold. The processor and the memory may be further configured to: determine a timing margin for rescheduling grants for queued data; compare the timing margin to a threshold; and invoke the assignment of the out-of-order sequence number if the timing margin is less than or equal to the threshold. The apparatus with means for functionality may further include: means for determining a timing margin for rescheduling grants for queued data; means for comparing the timing margin to a threshold; and means for invoking the assignment of the out-of-order sequence number if the timing margin is less than or equal to the threshold. The non-transitory computer-readable medium may further include code to: determine a timing margin for rescheduling grants for queued data; compare the timing margin to a threshold; and invoke the assignment of the out-of-order sequence number if the timing margin is less than or equal to the threshold.

The method may further include: determining a frequency of data unit fragmentations; comparing the frequency of data unit fragmentations to a threshold; and invoking the assignment of the out-of-order sequence number if the frequency of data unit fragmentations is greater than or equal to the threshold. The processor and the memory may be further configured to: determine a frequency of data unit fragmentations; compare the frequency of data unit fragmentations to a threshold; and invoke the assignment of the out-of-order sequence number if the frequency of data unit fragmentations is greater than or equal to the threshold. The apparatus with means for functionality may further include: means for determining a frequency of data unit fragmentations; means for comparing the frequency of data unit fragmentations to a threshold; and means for invoking the assignment of the out-of-order sequence number if the frequency of data unit fragmentations is greater than or equal to the threshold. The non-transitory computer-readable medium may further include code to: determine a frequency of data unit fragmentations; compare the frequency of data unit fragmentations to a threshold; and invoke the assignment of the out-of-order sequence number if the frequency of data unit fragmentations is greater than or equal to the threshold. The determination of the frequency of data unit fragmentations may include receiving an indication of the frequency of data unit fragmentations reported by at least one receiver.

The method may further include: determining a memory constraint associated with at least one receiver; comparing the memory constraint to a threshold; and invoking the assignment of the out-of-order sequence number if the memory constraint is less than or equal to the threshold. The processor and the memory may be further configured to: determine a memory constraint associated with at least one receiver; compare the memory constraint to a threshold; and invoke the assignment of the out-of-order sequence number if the memory constraint is less than or equal to the threshold. The apparatus with means for functionality may further include: means for determining a memory constraint associated with at least one receiver; means for comparing the memory constraint to a threshold; and means for invoking the assignment of the out-of-order sequence number if the memory constraint is less than or equal to the threshold. The non-transitory computer-readable medium may further include code to: determine a memory constraint associated with at least one receiver; compare the memory constraint to a threshold; and invoke the assignment of the out-of-order sequence number if the memory constraint is less than or equal to the threshold. The determination of the memory constraint may include receiving an indication of the memory constraint reported by the at least one receiver.

The method may further include: determining a metric based on grants that are out-of-order; comparing the metric to a threshold; and invoking the assignment of the out-of-order sequence number if the metric is less than or equal to the threshold. The processor and the memory may be further configured to: determine a metric based on grants that are out-of-order; compare the metric to a threshold; and invoke the assignment of the out-of-order sequence number if the metric is less than or equal to the threshold. The apparatus with means for functionality may further include: means for determining a metric based on grants that are out-of-order; means for comparing the metric to a threshold; and means for invoking the assignment of the out-of-order sequence number if the metric is less than or equal to the threshold. The non-transitory computer-readable medium may further include code to: determine a metric based on grants that are out-of-order; compare the metric to a threshold; and invoke the assignment of the out-of-order sequence number if the metric is less than or equal to the threshold. The metric may include a percentage of grants that are out-of-order.

The method may further include: determining a channel busy rate; comparing the channel busy rate to a threshold; and invoking the assignment of the out-of-order sequence number if the channel busy rate is greater than or equal to the threshold. The processor and the memory may be further configured to: determine a channel busy rate; compare the channel busy rate to a threshold; and invoke the assignment of the out-of-order sequence number if the channel busy rate is greater than or equal to the threshold. The apparatus with means for functionality may further include: means for determining a channel busy rate; means for comparing the channel busy rate to a threshold; and means for invoking the assignment of the out-of-order sequence number if the channel busy rate is greater than or equal to the threshold. The non-transitory computer-readable medium may further include code to: determine a channel busy rate; compare the channel busy rate to a threshold; and invoke the assignment of the out-of-order sequence number if the channel busy rate is greater than or equal to the threshold.

The method may further include: generating an indication of a period of time for reordering data units; and outputting the indication. The processor and the memory may be further configured to: generate an indication of a period of time for reordering data units; and output the indication. The apparatus with means for functionality may further include: means for generating an indication of a period of time for reordering data units; and means for outputting the indication. The non-transitory computer-readable medium may further include code to: generate an indication of a period of time for reordering data units; and output the indication. The generation of the indication may be based on a maximum pending time for over-the-air scheduled transmissions of data units.

A third aspect of the disclosure relates to a method, an apparatus for communication including a memory and a processor coupled to the memory, an apparatus for communication including means for functionality, and a non-transitory computer-readable medium storing computer-executable code as follows. The disclosure relates in some aspects to a method of communication, including: detecting at least one out-of-order grant of a traffic flow; determining a traffic condition associated with the traffic flow; and selecting a scheduling policy for the traffic flow based on the traffic condition. The disclosure relates in some aspects to an apparatus for communication including: a memory; and a processor coupled to the memory, the processor and the memory configured to: detect at least one out-of-order grant of a traffic flow; determine a traffic condition associated with the traffic flow; and select a scheduling policy for the traffic flow based on the traffic condition. The disclosure relates in some aspects to an apparatus for communication including: means for detecting at least one out-of-order grant of a traffic flow; means for determining a traffic condition associated with the traffic flow; and means for selecting a scheduling policy for the traffic flow based on the traffic condition. The disclosure relates in some aspects to a non-transitory computer-readable medium storing computer-executable code, including code to: detect at least one out-of-order grant of a traffic flow; determine a traffic condition associated with the traffic flow; and select a scheduling policy for the traffic flow based on the traffic condition. Other example aspects of the third aspect of the disclosure follow.

The traffic condition may include at least one of: traffic congestion, a timing margin for regenerating the at least one out-of-order grant, a frequency of data unit fragmentation, a metric based on grants that are out-of-order, a memory constraint, a maximum quantity of retransmissions, or any combination thereof.

The selection of the scheduling policy may include selecting: a first scheduling policy for regenerating out-of-order grants, a second scheduling policy for assigning out-of-order sequence numbers, or a third scheduling policy for transmitting bytes of message in sequence based on at least one grant size. The selection of the scheduling policy may include selecting a scheduling policy for regenerating out-of-order grants if: a frequency of data unit fragmentations is greater than or equal to a first threshold; and a timing margin for rescheduling grants for queued data is less than or equal to a second threshold. The selection of the scheduling policy may include selecting a scheduling policy for regenerating out-of-order grants if: a memory constraint associated with at least one receiver is greater than or equal to a first threshold; and a timing margin for rescheduling grants for queued data is less than or equal to a second threshold. The selection of the scheduling policy may include selecting a scheduling policy for assigning out-of-order sequence numbers if: a memory constraint associated with at least one receiver is less than or equal to a first threshold; and a timing margin for rescheduling grants for queued data is greater than or equal to a second threshold. The selection of the scheduling policy may include selecting a scheduling policy for assigning out-of-order sequence numbers if: a memory constraint associated with at least one receiver is less than or equal to a first threshold; a timing margin for rescheduling grants for queued data is greater than or equal to a second threshold; and a channel busy rate is greater than or equal to a third threshold. The selection of the scheduling policy may include selecting a scheduling policy for assigning out-of-order sequence numbers if: a memory constraint associated with at least one receiver is less than or equal to a first threshold; and a frequency of data unit fragmentations is greater than or equal to a second threshold. The selection of the scheduling policy may include selecting a scheduling policy for assigning out-of-order sequence numbers if: a timing margin for rescheduling grants for queued data is less than or equal to a first threshold; and a frequency of data unit fragmentations is greater than or equal to a second threshold. The selection of the scheduling policy may include selecting a scheduling policy for transmitting messages based on at least one grant size if: a memory constraint associated with at least one receiver is greater than or equal to a first threshold. The selection of the scheduling policy may include selecting a scheduling policy for transmitting messages based on at least one grant size if: a timing margin for rescheduling grants for queued data is less than or equal to a first threshold; and a channel busy rate is greater than or equal to a second threshold. The traffic condition may include relative sizes of messages; and the selection of the scheduling policy may include, if the relative sizes are within a threshold range, selecting a scheduling policy for transmitting messages based on at least one grant size.

A fourth aspect of the disclosure relates to a method, an apparatus for communication including a memory and a processor coupled to the memory, an apparatus for communication including means for functionality, and a non-transitory computer-readable medium storing computer-executable code as follows. The disclosure relates in some aspects to a method of communication, including: obtaining an indication of a data unit reordering window; receiving at least one data unit; detecting at least one out-of-order sequence number associated with the at least one data unit; and reordering the at least one data unit during the data unit reordering window. The disclosure relates in some aspects to an apparatus for communication including: a memory; and a processor coupled to the memory, the processor and the memory configured to: obtain an indication of a data unit reordering window; receive at least one data unit; detect at least one out-of-order sequence number associated with the at least one data unit; and reorder the at least one data unit during the data unit reordering window. The disclosure relates in some aspects to an apparatus for communication including: means for obtaining an indication of a data unit reordering window; means for receiving at least one data unit; means for detecting at least one out-of-order sequence number associated with the at least one data unit; and means for reordering the at least one data unit during the data unit reordering window. The disclosure relates in some aspects to a non-transitory computer-readable medium storing computer-executable code, including code to: obtain an indication of a data unit reordering window; receive at least one data unit; detect at least one out-of-order sequence number associated with the at least one data unit; and reorder the at least one data unit during the data unit reordering window. Other example aspects of the fourth aspect of the disclosure follow.

The method may further include: determining at least one priority of at least one packet; and terminating the reordering based on the at least one priority. The processor and the memory may be further configured to: determine at least one priority of at least one packet; and terminate the reordering based on the at least one priority. The apparatus with means for functionality may further include: means for determining at least one priority of at least one packet; and means for terminating the reordering based on the at least one priority. The non-transitory computer-readable medium may further include code to: determine at least one priority of at least one packet; and terminate the reordering based on the at least one priority.

The method may further include: determining an indication of traffic congestion; and terminating the reordering if the indication of traffic congestion is greater than or equal to a threshold. The processor and the memory may be further configured to: determine an indication of traffic congestion; and terminate the reordering if the indication of traffic congestion is greater than or equal to a threshold. The apparatus with means for functionality may further include: means for determining an indication of traffic congestion; and means for terminating the reordering if the indication of traffic congestion is greater than or equal to a threshold. The non-transitory computer-readable medium may further include code to: determine an indication of traffic congestion; and terminate the reordering if the indication of traffic congestion is greater than or equal to a threshold.

The obtaining of the indication of the data unit reordering window may include: receiving a data unit that includes the indication. The obtaining of the indication of the data unit reordering window may include: determining whether an indication of the data unit reordering window has been received; and obtaining a default indication of the data unit reordering window if the indication of the data unit reordering window has not been received.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in 1-DD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
a memory; and
a processor coupled to the memory, the processor and the memory configured to:
 detect at least one out-of-order grant of a traffic flow,
 determine a traffic condition associated with the traffic flow, wherein the traffic condition comprises at least one of: traffic congestion, a timing margin for regenerating the at least one out-of-order grant, a frequency of data unit fragmentation, a memory constraint, or any combination thereof,
 select a scheduling policy for the traffic flow based on the traffic condition, and
 transmit a transmission via the transceiver according to the scheduling policy.

2. The apparatus of claim 1, wherein the processor and the memory are further configured to select a first scheduling policy that assigns out-of-order sequence numbers for the traffic flow.

3. The apparatus of claim 2, wherein the sequence numbers comprise radio link control (RLC) sequence numbers.

4. The apparatus of claim 1, wherein the processor and the memory are further configured to select a first scheduling policy that regenerates the at least one out-of-order grant.

5. The apparatus of claim 4, wherein the processor and the memory are further configured to:
cancel the at least one out-of-order grant; and
generate at least one in-order grant.

6. The apparatus of claim 1, wherein the processor and the memory are further configured to select between: a first scheduling policy for regenerating the at least one out-of-order grant, a second scheduling policy for assigning out-of-order sequence numbers, and a third scheduling policy for transmitting bytes of message in sequence based on at least one grant size.

7. The apparatus of claim 1, wherein the traffic condition comprises traffic congestion.

8. The apparatus of claim 1, wherein the traffic condition comprises a timing margin for regenerating the at least one out-of-order grant.

9. The apparatus of claim 1, wherein the traffic condition comprises a frequency of data unit fragmentation.

10. The apparatus of claim 1, wherein the traffic condition comprises a metric based on grants that are out-of-order.

11. The apparatus of claim 1, wherein the traffic condition comprises a memory constraint.

12. The apparatus of claim 1, wherein the traffic condition comprises a maximum quantity of retransmissions.

13. A method of communication, comprising:
detecting at least one out-of-order grant of a traffic flow;
determining a traffic condition associated with the traffic flow, wherein the traffic condition comprises at least one of: traffic congestion, a timing margin for regenerating the at least one out-of-order grant, a frequency of data unit fragmentation, a memory constraint, or any combination thereof;
selecting a scheduling policy for the traffic flow based on the traffic condition; and
transmitting a transmission according to the scheduling policy.

14. The method of claim 13, wherein the selecting the scheduling policy comprises selecting a first scheduling policy that assigns out-of-order sequence numbers for the traffic flow.

15. The method of claim 14, wherein the sequence numbers comprise radio link control (RLC) sequence numbers.

16. The method of claim 13, wherein the selecting the scheduling policy comprises selecting a first scheduling policy for regenerating the at least one out-of-order grant.

17. The method of claim 16, wherein the regenerating the at least one out-of-order grant comprises:
canceling the at least one out-of-order grant; and
generating at least one in-order grant.

18. The method of claim 13, wherein the selecting the scheduling policy comprises selecting between: a first scheduling policy for regenerating the at least one out-of-order grant, a second scheduling policy for assigning out-of-order sequence numbers, and a third scheduling policy for transmitting bytes of a message in sequence based on at least one grant size.

19. The method of claim 13, wherein the traffic condition comprises at least one of: a metric based on grants that are out-of-order, a maximum quantity of retransmissions, or any combination thereof.

20. An apparatus for communication, comprising:
means for detecting at least one out-of-order grant of a traffic flow;
means for determining a traffic condition associated with the traffic flow, wherein the traffic condition comprises at least one of: traffic congestion, a timing margin for regenerating the at least one out-of-order grant, a frequency of data unit fragmentation, a memory constraint, or any combination thereof;
means for selecting a scheduling policy for the traffic flow based on the traffic condition; and
means for transmitting a transmission according to the scheduling policy.

21. A non-transitory computer-readable medium storing computer-executable code for communication, including code to:
detect at least one out-of-order grant of a traffic flow;
determine a traffic condition associated with the traffic flow, wherein the traffic condition comprises at least one of: traffic congestion, a timing margin for regenerating the at least one out-of-order grant, a frequency of data unit fragmentation, a memory constraint, or any combination thereof;

select a scheduling policy for the traffic flow based on the traffic condition; and transmit a transmission according to the scheduling policy.

* * * * *